United States Patent [19]
Ueno et al.

[11] Patent Number: 5,960,390
[45] Date of Patent: *Sep. 28, 1999

[54] CODING METHOD FOR USING MULTI CHANNEL AUDIO SIGNALS

[75] Inventors: Masatoshi Ueno; Shinji Miyamori, both of Tokyo, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/720,663

[22] Filed: Oct. 2, 1996

[30] Foreign Application Priority Data

Oct. 5, 1995 [JP] Japan .................................. 7-258655

[51] Int. Cl.$^6$ ....................................................... G10L 7/02
[52] U.S. Cl. ........................... 704/229; 704/225; 704/230; 704/222; 704/500
[58] Field of Search ..................................... 704/225, 229, 704/227, 233, 222, 230, 500–504

[56] References Cited

U.S. PATENT DOCUMENTS 4,002,841  1/1977  Ching et al. ........................ 179/15 AS
4,485,483  11/1984  Torick et al. .............................. 381/14

(List continued on next page.)

FOREIGN PATENT DOCUMENTS

| 0193143 B1 | 2/1986 | European Pat. Off. .......... H04B 1/66 |
| 0251028 A2 | 6/1987 | European Pat. Off. .......... H04B 1/66 |
| 0424161 A2 | 4/1991 | European Pat. Off. .......... G10L 9/16 |
| 0428156 A2 | 5/1991 | European Pat. Off. ......... H03M 7/30 |
| 0653846 A1 | 5/1995 | European Pat. Off. ......... H03M 7/30 |
| 63-7023 | 1/1988 | Japan .............................. H03M 1/00 |
| 3-132228 | 6/1991 | Japan ............................. H04B 14/00 |
| 6-334534 | 12/1994 | Japan ............................. H03M 7/30 |
| WO 91/16769 | 10/1991 | WIPO .............................. H04B 1/66 |

OTHER PUBLICATIONS

M. Fuma et al., "A Single Chip Decompression LSI Based on Atrac For Mini Disc", IEEE Transactions on Consumer Electronics, vol. 39, No. 3, Aug. 1993.

A. Sugiyama, et al., "Adaptive Transform Coding With An Adaptive Block Size (ATC–ABS)", C&C Systems Research Labs, NEC Corp., Kanagawa, Japan, IEEE 1990.

R. Crochiere, "Digital Coding of Speech in Sub–Bands," The Bell System Technical Journal, vol. 55, No. 8, Oct. 1976.

J. Rothweiler, "Polyphase Quadrature Filters—A New Subband Coding Technique," ICASSP Apr. 14–16, 1983, vol. 3, pp. 1280–1283.

(List continued on next page.)

Primary Examiner—David R. Hudspeth
Assistant Examiner—Vijay B. Chawan
Attorney, Agent, or Firm—Limbach & Limbach L.L.P.

[57] ABSTRACT

There is provided a coding method which can effectively prevent a pre-echo and a post-echo from being generated and can perform effective coding to which an psycho-acoustic model is applied. A coding apparatus according to the coding method of the present invention detects the attack and release portions of a waveform signal, and performs gain control to a waveform signal before the attack portion and the waveform signal of the release portion by using a gain control amount adaptively calculated according to the characteristics of the waveform signal. An psycho acoustic model window circuit to an aural model application circuit calculate a masking level based on the psycho-acoustic model from a frequency component obtained by transforming the waveform signal, and a quantization precision determination circuit determines a quantization precision by using the masking level. An window circuit and a transform circuit transform the waveform signal into a plurality of frequency components. The quantization circuit quantizes the plurality of frequency components by using the quantization precision.

39 Claims, 11 Drawing Sheets

U.S. PATENT DOCUMENTS

| | | | |
|---|---|---|---|
| 4,696,040 | 9/1987 | Doddington et al. | 381/46 |
| 4,704,726 | 11/1987 | Gibson | 381/13 |
| 4,972,484 | 11/1990 | Theile et al. | 704/227 |
| 5,109,417 | 4/1992 | Fielder et al. | 381/36 |
| 5,117,228 | 5/1992 | Fuchigami et al. | 341/200 |
| 5,134,658 | 7/1992 | Chen et al. | 704/233 |
| 5,142,656 | 8/1992 | Fielder et al. | 381/37 |
| 5,157,760 | 10/1992 | Akagiri | 395/2 |
| 5,185,800 | 2/1993 | Mahieux | 381/29 |
| 5,241,603 | 8/1993 | Akagiri et al. | 381/37 |
| 5,264,846 | 11/1993 | Oikawa | 341/76 |
| 5,268,685 | 12/1993 | Fujiwara | 341/76 |
| 5,274,711 | 12/1993 | Rutledge et al. | 704/225 |
| 5,285,476 | 2/1994 | Akagiri et al. | 375/25 |
| 5,384,891 | 1/1995 | Asakawa et al. | 395/2.29 |
| 5,388,181 | 2/1995 | Anderson et al. | 395/212 |
| 5,394,473 | 2/1995 | Davidson | 381/36 |
| 5,410,741 | 4/1995 | Cahill et al. | 455/69 |
| 5,438,643 | 8/1995 | Akagiri et al. | 395/2.1 |
| 5,454,011 | 9/1995 | Shimoyoshi | 375/240 |
| 5,471,558 | 11/1995 | Tsutsui | 395/2.28 |
| 5,502,789 | 3/1996 | Akagiri | 395/2.13 |
| 5,506,907 | 4/1996 | Ueno | 381/18 |
| 5,541,600 | 7/1996 | Blumenkrantz et al. | 341/139 |
| 5,550,924 | 8/1996 | Helf et al. | 704/225 X |
| 5,581,654 | 12/1996 | Tsutsui | 395/2.39 |
| 5,623,577 | 4/1997 | Fielder | 704/229 |
| 5,625,743 | 4/1997 | Fiocca | 704/229 X |
| 5,632,003 | 5/1997 | Davidson et al. | 704/227 X |
| 5,634,082 | 5/1997 | Shimoyoshi et al. | 395/2.38 |
| 5,651,090 | 7/1997 | Moriya et al. | 704/222 |

OTHER PUBLICATIONS

J. Princen et al., "Subband Transform Coding Using Filter Bank Based On Time Domain Aliasing Cancellation," ICASSP Apr. 6–9, 1987, vol. 4, pp. 2161–2164.

M. Krasner, "The Critical Band Coder—Encoding of Speech Signals Based on the Perceptual Requirements of the Auditory System," ICASSP, Apr. 1980, vol. 1–3, pp. 327–331.

R. Zelinski et al., "Adaptive Transform Coding of Speech Signals," IEEE Transactions on Acoustics, Speech and Signal Processing, vol. ASSP–25, No. 4, Aug. 1977.

U.S. application No. 08/604,479, filed Feb. 21, 1996.

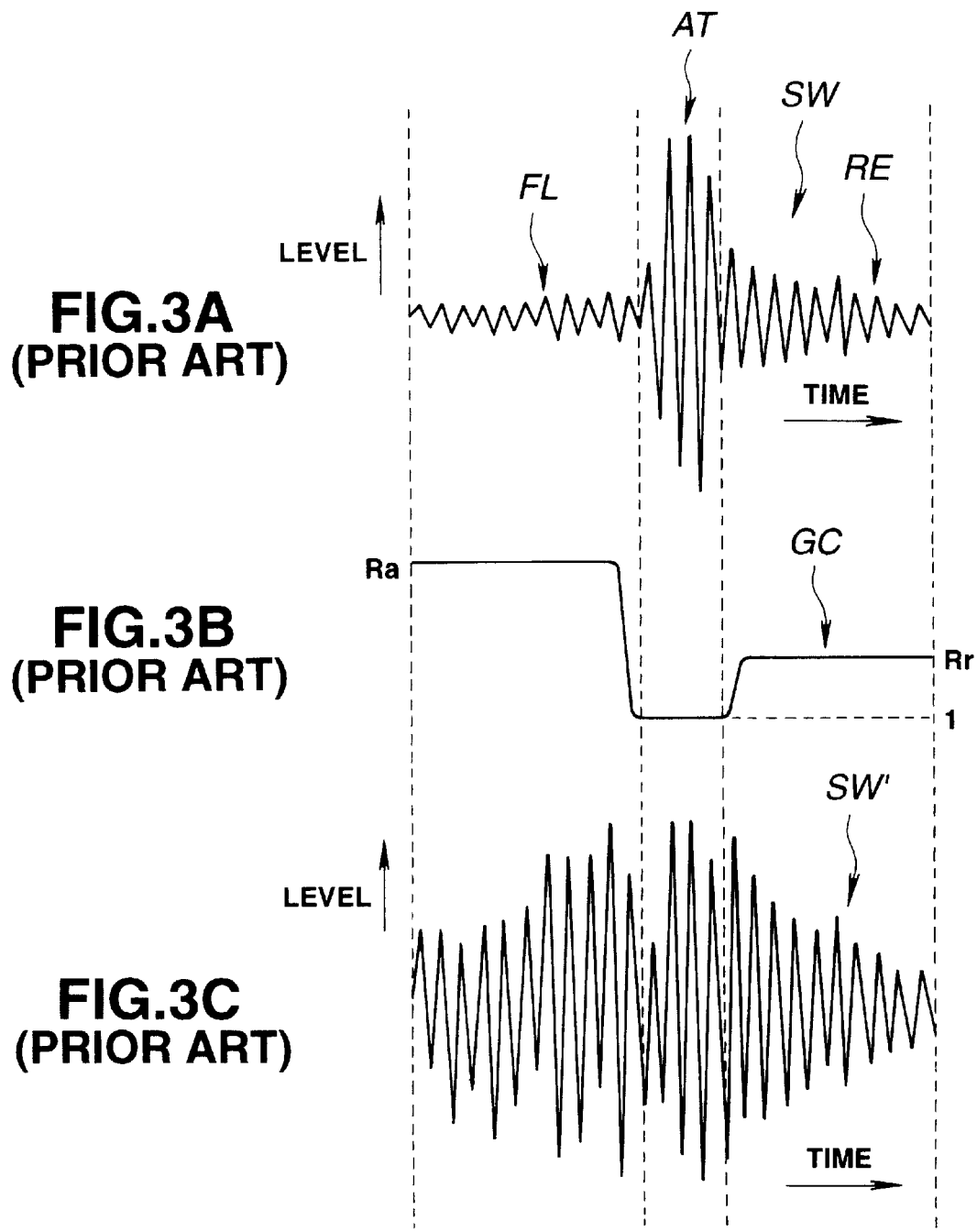

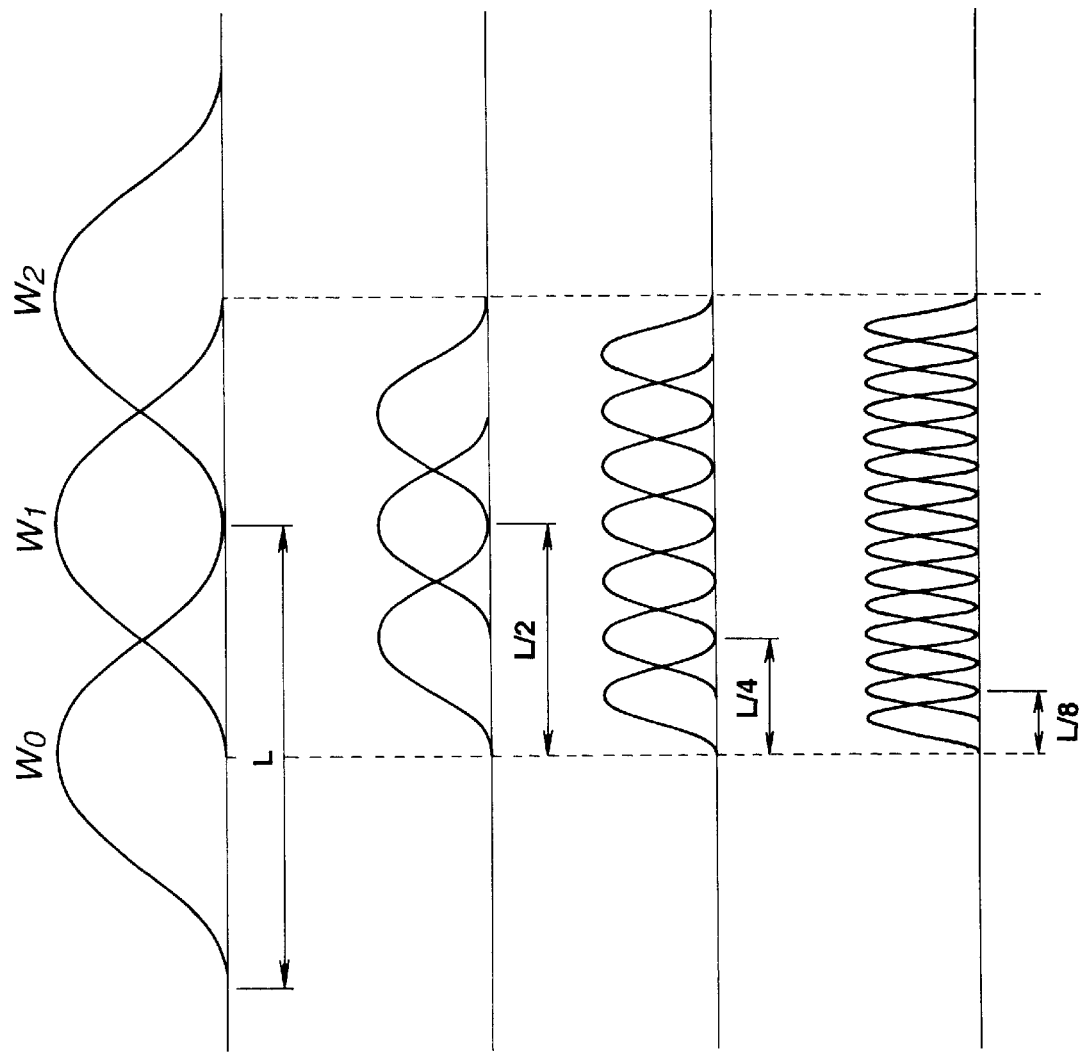

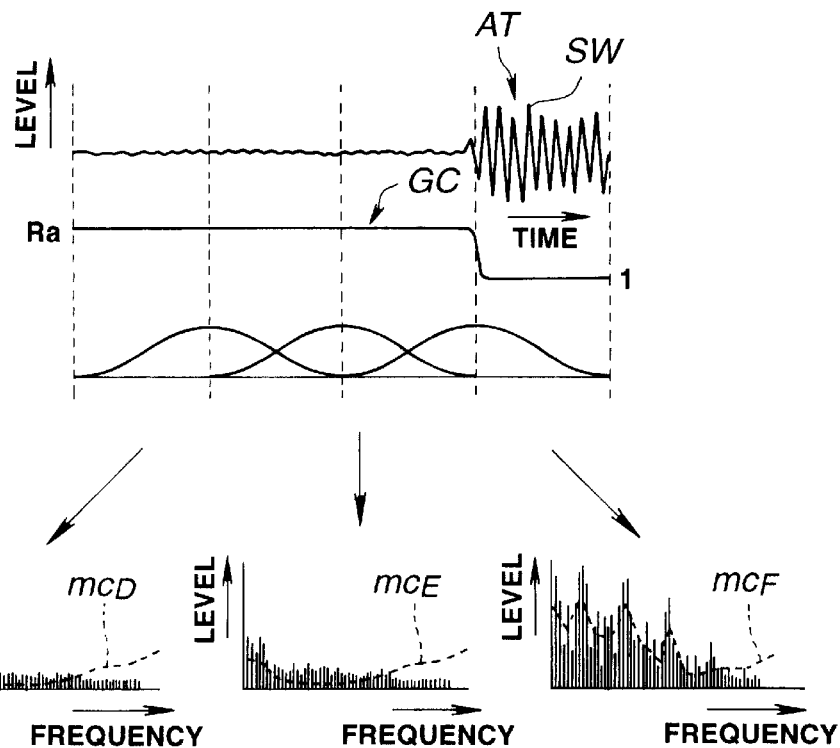
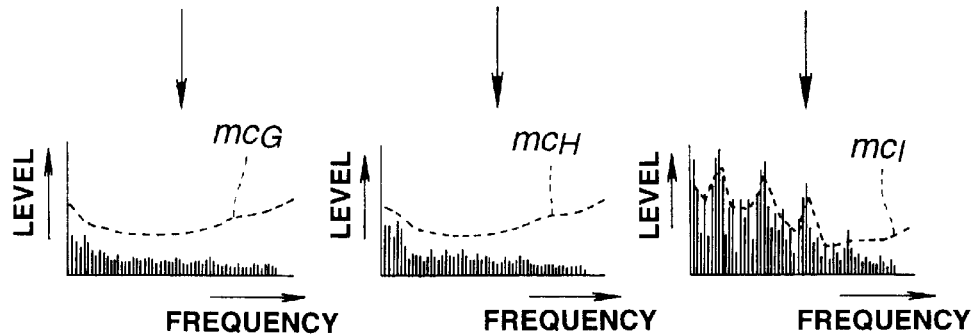
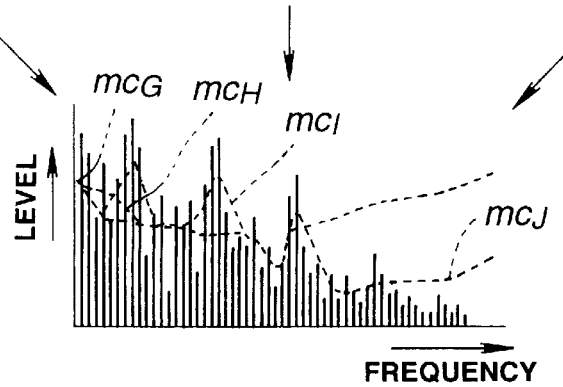
FIG.8A
FIG.8B
FIG.8C
FIG.8D
FIG.8E
FIG.8F
FIG.8G
FIG.8H
FIG.8I
FIG.8J

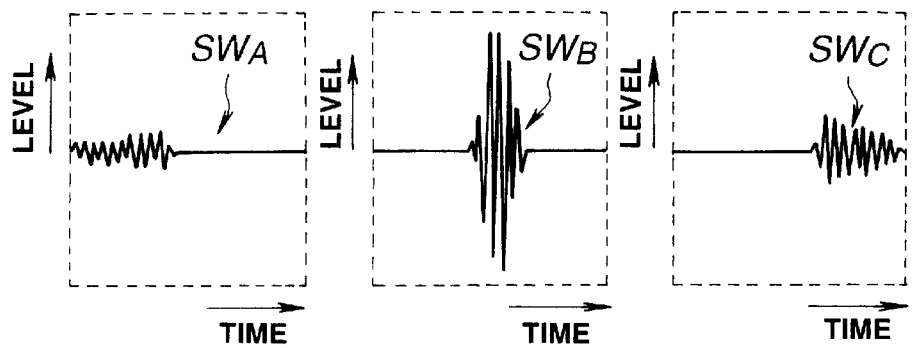
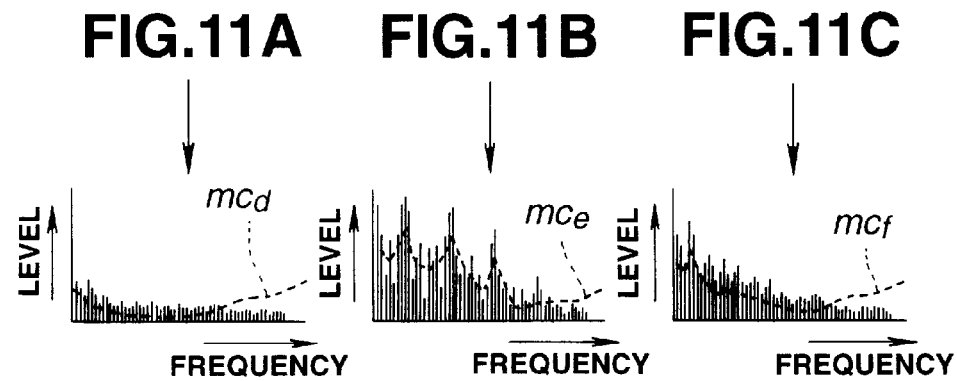
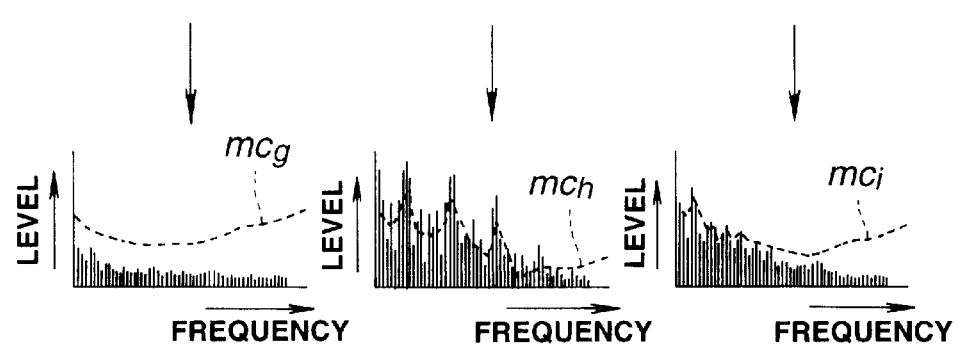
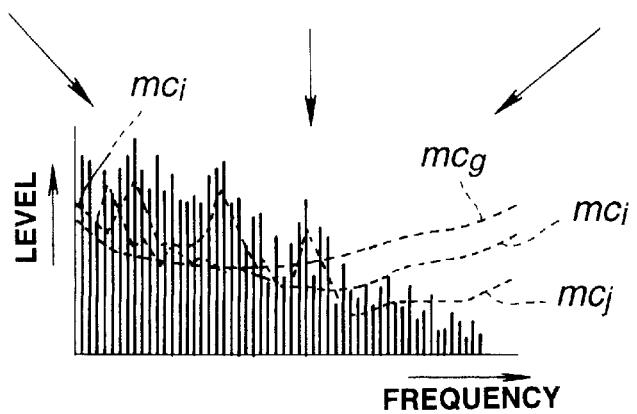
FIG.11A  FIG.11B  FIG.11C
FIG.11D  FIG.11E  FIG.11F
FIG.11G  FIG.11H  FIG.11I
FIG.11J

CODING METHOD FOR USING MULTI CHANNEL AUDIO SIGNALS

BACKGROUND OF THE INVENTION

1. Field of the Invention

The present invention relates to a coding method and a coding apparatus for a sound signal, in which a sound signal such as digital data by a so-called high-efficient coding method.

2. Description of the Related Art

Various types of methods and apparatus for high-efficient coding audio or sound signals are conventionally used. For example, a so-called transform coding scheme (to be described below) is used. That is, a signal on a time axis is framed in units of predetermined periods of time to transform the signal on the time axis of each frame is transformed into a signal on a frequency axis (spectrum transform) and to be divided into a plurality of frequency areas, thereby performing a coding operation in each band. In addition, a so-called band division coding (sub-band coding: SBC) is available in which an audio signal or the like on a time axis is not framed but divided into a plurality of frequency bands to be coded.

A high-efficient coding method and apparatus obtained by combining the band division coding scheme to the transform coding scheme is proposed. In this case, for example, after band division is performed by the band division coding scheme, a signal of each band is spectrum-transformed into a signal on a frequency axis, and the spectrum-transformed signal in each band is coded.

In this case, as a band dividing filter used in the band division coding scheme, for example, a filter such as a QMF (Quadrature Mirror Filter) is used. This filter is described in the letter "Digital coding of speech in subbands" R. E. Crochiere, Bell Syst. Tech. J., Vol. 55, No. 81976. This QMF is used to divide a band into two bands having equal bandwidths. This filter has the following characteristics. That is, so-called aliasing does not occur when the divided bands are synthesized.

The letter "Polyphase Quadrature filters—A new subband coding technique", Joseph H. Rothweiler ICASSP 83, BOSTON) describes a filter dividing method for dividing a band into bands having equal bandwidths. The polyphase quadrature filter has the following characteristics. That is, a signal can be divided into a plurality of bands having equal widths at once.

When, as the spectrum transform described above, the following is performed. For example, an input audio signal is framed in units of predetermined periods of time, and discrete Fourier transform (DFT), discrete cosine transform (DCT), modified discrete cosine transform (MDCT), or the like is performed in each frame, thereby transforming a time axis into a frequency axis. The MDCT is described in the letter "Subband/Transform Coding Using Filter Bank Designs Based on Time Domain Aliasing Cancellation," J. P. Princen A. B. Bradley, Univ. of Surrey Royal Melbourne Inst. of Tech. ICASSP 1987.

When signals divided by a filter or spectrum transform in units of bands as described above is quantized, a band in which quantization noise is generated can be controlled, and aurally high-efficient coding can be performed using properties of so-called masking effect or the like. In addition, when normalization is performed by the maximum value of the absolute value of a signal component in each band before the quantization, coding can be more efficiently performed.

In this case, as a frequency division width used when frequency components (to be referred to as spectrum components) divided into frequency bands are quantized, a bandwidth obtained in consideration of the aural characteristics of human being is often used. More specifically, an audio signal may be divided into a plurality of bands (e.g., 25 bands) each having a bandwidth equal to that of a critical band whose bandwidth generally increases with an increase in frequency. When data in each band at this time is coded, coding is performed by predetermined bit distribution in each band or adaptive bit allocation in each band. For example, when coefficient data obtained by performing the MDCT process is coded by the bit allocation, MDCT coefficient data in each band obtained by the MDCT process in each frame is coded at tile number of adaptive allocation bits.

As the bit distribution method, the two following methods are known.

For example, in the letter "Adaptive Transform Coding of Speech Signals", R. Zelinski, P. Noll, IEEE Transactions of Acoustics, Speech, and Signal Processing, vol. ASSP-25, No. 4, August 1977, bit allocation is performed on the basis of the size of a signal of each band. In this scheme, a quantization noise spectrum is flat, and noise energy is minimum. However, since a masking effect is not aurally used, the hearing sense of noise is not actually optimum.

In addition, for example, in the letter "The critical band coder—digital encoding of the perceptual requirements of the auditory system", M. A. kransner MIT, ICASSP 1980), a method in which a signal-noise ratio required for each band is obtained by using aural masking to perform fixed bit allocation. However, in this method, even if characteristics are measured by a sine wave input, a characteristic value is not always good because the bit allocation is fixed.

In order to solve this problem, a high-efficiency coding apparatus having the following arrangement is proposed. That is, all bits which can be used in bit allocation are separately used for a fixed allocation pattern predetermined in each of sub-blocks obtained by dividing each of the above blocks and for bit distribution depending on the size of a signal in each block, and the division ratio is made to be dependent on a signal related to an input signal. For example, the division ratio to the fixed bit allocation pattern is set to be large when the spectrum distribution of the signal is smooth.

According to this method, when energy is concentrated on a specific spectrum component as in a sine wave input, entire signal-noise characteristics can be considerably improved such that a large number of bits are allocated to a block including the spectrum component. In general, the hearing sense of a human being is very sensitive with respect to a signal having a sharp spectrum distribution. For this reason, when the signal-noise characteristics are improved by using such a method, not only is a numeral value on measurement is improved, but also aural tone quality is effectively improved.

Various types of method for bit allocation other than the above are proposed. When a model related to hearing sense is made accurate, and the capability of the coding apparatus is improved, coding which is aurally efficient can be performed.

In this case, when the DFT or DCT is used as a method of performing spectrum transform to a waveform signal consisting of waveform elements (sample data) such as digital audio signals in a time area, blocks are constituted in units of M sample data, and spectrum transform for the DFT or DCT is performed. When the spectrum transform is performed to such blocks, M independent real number data (DFT coefficient data or DCT coefficient data) are obtained. The M real number data obtained as described above are quantized and coded to be coded data.

When reproduction waveform signal is reproduced by decoding the coded data, the coded data is decoded to be inversely quantized, and inverse spectrum transform by inverse DFT or inverse DCT is performed to the obtained real data in units of blocks corresponding to the blocks in the coding operation to obtain waveform element signals. The blocks constituted by the waveform element signals are connected to each other to reproduce the waveform signal.

The reproduced waveform signal generated as described above has connection distortion generated in block connection, and is not aurally preferable. For this reason, in order to reduce connection distortion between the blocks, when spectrum transform is performed using DFT or DCT in actual coding, M1 sample data of adjacent blocks are made to overlap, and these sample data are subjected to the spectrum transform.

When spectrum transform is performed such that M1 sample data of the adjacent blocks overlap, M real number data are obtained with respect to (M−M1) (average number) sample data. As a result, the number of real number data obtained by the spectrum transform is larger than the number of original sample data actually used in the spectrum transform. Since the real number data are to be quantized and coded later, it is not preferable on coding efficiency that the number of real number data obtained by the spectrum transform is larger than the number of original sample data as described above.

In contrast to this, when the MDCT is used as a method of performing spectrum transform to a waveform signal constituted by sample data such as digital audio signals, spectrum transform is performed by using 2M sample data obtained by making M sample data of adjacent blocks to overlap to reduce connection distortion between the blocks, thereby obtaining M independent real number data (MDCT coefficient data). For this reason, in the spectrum transform by the MDCT, M real number data are obtained with respect to M (average number) sample data. Therefore, coding which is more efficient than the spectrum transform using the DFT or DCT can be performed.

When coded data obtained by quantizing and coding the obtained real number data by using the MDCT spectrum transform is decoded to generate a reproduced waveform signal, the coded data is decoded to be inversely quantized. Inverse spectrum transform by inverse MDCT is performed to the obtained real number to obtain waveform elements in the blocks, and the waveform elements in the blocks are added to each other while being interfered with each other, thereby reconstructing the waveform signal.

In this case, in general, when the length (dimension of a block in a dime direction) of a block for spectrum transform is increased, a frequency resolving power is improved. When a waveform signal such as a digital audio signal is subjected to spectrum transform in such a long block, energy is concentrated on a specific spectrum component. As described above, when the spectrum transform is performed to adjacent blocks which overlap over a large length, the inter-block distortion of the waveform signal can be preferably reduced.

In addition, when spectrum transform is performed to blocks in which a half number of sample data of adjacent blocks overlap, and the MDCT in which the number of real number data obtained by the spectrum transform does not increase with respect to the number of sample data of the original waveform signal is used, coding which is more efficient than that by the spectrum transform using the DFT or DCT can be performed.

When a method in which the waveform signal is divided into blocks, each block is resolved into spectrum components (real number data obtained by the spectrum transform in the above example), and the obtained spectrum components are quantized and coded is used, quantization noise is generated in a waveform signal obtained such that signals constituted by the spectrum components are decoded and synthesized in each block.

If the original waveform signal includes a portion in which a signal component sharply changes (transition portion whose waveform element level sharply changes), and the waveform signal is temporarily coded and then decoded, large quantization noise caused by the transition portion may extend in a portion of the original waveform signal other than the transition portion.

Assume that the following waveform signal SW1 is used as a coded audio signal. That is, in the waveform signal SW1, as shown in FIG. 7A, an attack portion AT in which sound sharply increases as the transition portion is present next to a quasi stationary signal FL which slightly changes and has a low level, and signals each having a high level are subsequent to the attack portion AT. The waveform signal SW1 is divided into blocks each having a unit time width, and a signal component in each block is subjected to spectrum transform. When the obtained spectrum components are quantized and coded, and then subjected to inverse spectrum transform, decoding, and inverse quantization, the reproduced waveform signal SW1 includes large quantization noise QN1 caused by the attack portion AT in all the blocks as shown in FIG. 11C.

For this reason, as shown in FIG. 7C, in the portion of the quasi stationary signal FL before the attack portion AT, large (e.g., higher level than that of the quasi stationary signal FL) quantization noise QN1 caused by the attack portion AT appears.

Since the quantization noise QN1 appearing in the quasi stationary signal FL before the attack portion AT is not shielded by simultaneous masking performed by the attack portion AT, the quantization noise QN1 acts as aural hindrance. As described above, the quantization noise QN1 appearing before the attack portion AT in which sound sharply increases is generally called a pre-echo.

When the signal components in the blocks are subjected to spectrum transform, the spectrum transform is performed after the blocks are multiplied by a transform window function (window function) TW having a characteristic curve whose end portions moderately change as shown in FIG. 7B. In this manner, a spectrum distribution is prevented from extending in a wide area.

In particular, when a waveform signal is subjected to spectrum transform in a long block to improve the frequency resolving power as described above, a time resolving power is degraded, and a pre-echo may be generated for a long period of time.

In this case, the block in spectrum transform is shortened, the period of time in which the quantization noise is generated is also shortened. For this reason, for example, if the length of the block subjected to spectrum transform near the attack portion is decreased, the period of time in which a pre-echo can be shortened, and aural hindrance caused by the pre-echo can be reduced.

More specifically, a case wherein the pre-echo is prevented by shortening the block near the attack portion will be described below. Near the transition portion such as the attack portion AT in which the magnitude of sound sharply changes in the waveform signal SW including the quasi stationary signal FL and the attack portion AT as shown in FIG. 2A, a block for spectrum transform is shortened, the spectrum transform is performed to a signal component in the short block. As a result, a period of time in which a pre-echo is generated can be sufficiently shortened in the short block.

If the period of time in which a pre-echo is generated in the block can be sufficiently shortened, an aural hinderance can be reduced by a so-called inverse masking effect obtained by the attack portion AT. In this short block, when a signal component in the short block is to be subjected to spectrum transform, the signal component is subjected to the spectrum transform after the signal component is multiplied by a short transform window function (short transform window function TWS) as shown in FIG. 2B.

When the block for spectrum transform is shortened with respect to signal portions subsequent to the portion of the quasi stationary signal FL and the attack portion AT, a frequency resolving power is degraded, and coding efficiency in these portions is also degraded. For this reason, when the block for spectrum transform is increased in length with respect to these portions, energy is concentration on a specific spectrum component.

As a result, coding efficiency is desirably improved.

For these reasons, in fact, the length of the block for spectrum transform is selectively switched depending on the nature of each portion of the waveform signal SW. When the length of the block is selectively switched as described above, the transform window function TW is also switched depending on the selection of the length of the block. For example, the following selective switching operation is performed. That is, as shown in FIG. 2B, a long transform window function (long transform window function TWL) is used for a block constituted by the quasi stationary signal FL except for a portion near the attack portion AT, and a short transform window function (short transform window function TWS) is used for a short block near the attack portion AT.

However, as described above, when the method in which the length of a block in spectrum transform is switched depending on the nature (characteristics) of each portion of the waveform signal is realized on an actual arrangement, a spectrum transforming means which can cope with spectrum transform in blocks having different lengths must be arranged in the coding apparatus. In addition, an inverse spectrum transform means which can perform inverse spectrum transform which can cope with blocks having different lengths must be arranged in the decoding apparatus.

The length of a block in spectrum transform is to be changed, the number of spectrum components obtained by the spectrum transform is in proportion to the length of the block. These spectrum components are coded in units of critical bands, the number of spectrum components included in each critical band changes depending on the length of a block. For this reason, a coding process to be described later and a decoding process become complexed.

In this manner, in the method in which the length of a block in spectrum transform is made variable, both the coding apparatus and the decoding apparatus are disadvantageously complexed.

For this reason, when the spectrum transform such as the DFT or DCT is applied to resolve a block into spectrum components, as a method in which a pre-echo can be effectively prevented from being generated while keeping the length of a block in the spectrum transform constant to assure a sufficiently high frequency resolving power, a technique disclosed in U.S. Pat. No. 5,117,228 is known. In this publication, the following method is disclosed. That is, an input signal waveform is cut into blocks constituted by a plurality of sample data in the coding apparatus, and the blocks are multiplied by a window function. Thereafter, an attack portion is detected, a small-amplitude waveform signal (i.e., quasi stationary signal) immediately before the attack portion is amplified, and spectrum components (real number data) are obtained by spectrum transform using DFT or DCT. Then, the spectrum components are coded.

In decoding corresponding to the above coding, the decoded spectrum components are subjected to inverse spectrum transform performed by inverse DFT (=IDFT) or inverse DCT (=IDCT), and a process of correcting amplification of a signal immediately before the attack portion in coding is performed. In this manner, a pre-echo is prevented from being generated. Since the length of a block subjected to spectrum transform can be kept constant by using the above method, the arrangements of the coding and decoding apparatuses can be simplified.

According to the technique described in the publication, by using a gain control process performed in coding and for a small-amplitude signal immediately before an attack portion and a gain control correction process performed in decoding and corresponding to gain control performed to a signal immediately before the attack portion in coding, a pre-echo can be prevented from being generated while keeping the length of the block in spectrum transform constant.

For example, in the specification and drawings of U.S. Ser. No. 08/604,479 (filed on Feb. 21, 1996) applied by the present applicant, the present applicant has proposed a method of preventing not only a pre-echo but also a post-echo. In this specification and drawings, the following is proposed. That is, in a method and apparatus for coding a waveform signal, an attack portion in which the levels of the waveform elements of the waveform signal sharply rise is detected, and a release portion in which the levels of the waveform elements of the waveform signal sharply lower is detected. An adaptive gain control amount is selected depending on the characteristics of the waveform signal from a plurality of gain control amounts for a waveform element before at least the attack portion and a waveform element of the release portion, and gain control is performed to the waveform element before at least the attack portion and the waveform element of the release portion by using the selected gain control amount. The waveform signal is transformed into a plurality of frequency components (spectrum components), and control information for the gain control and a plurality of frequency components are coded.

More specifically, according to the coding method and apparatus, the attack and release portions are detected from the waveform signal, gain control is performed to the portion before the attack portion and the waveform element of the release portion at the gain control amount adaptively selected depending on the characteristics of the waveform signal, and the portion before the attack portion and the waveform element of the release portion are coded. In decoding, gain control correction is performed to the portion subjected to gain control in coding. For this reason, the energy of noise generated in the portion before the attack portion and the release portion when the waveform signal is coded and decoded can be lowered to a level at which a human being cannot easily sense the noise.

However, in a method of preventing generation of a pre-echo and a post-echo using the gain control and the gain control correction, a waveform signal obtained by amplifying small-amplitude waveform signals before and after the attack portion is used in coding. For this reason, a spectrum component which is coded and subjected to the gain control is considerably different from the spectrum component of actually reproduced voice.

For example, as a waveform signal in which the pre-echo and post-echo are generated, like a waveform signal SW shown in FIG. 3A, a waveform signal in which an attack portion AT is subsequent to a quasi stationary signal FL, and a release portion RE whose level sharply lowers is subsequent to the quasi stationary signal FL will be explained. As in the gain control function GC shown in FIG. 3A, assume that gain control having a gain control amount which is Ra times is performed to a signal component (waveform signal FL) serving as a portion immediately before the attack portion AT, and that gain control having a gain control amount which is Rr times is performed to the release portion RE after the attack portion AT. As a result, in fact, a waveform signal SW' shown in FIG. 3C is coded.

On the other hand, assume that a masking curve calculated using an psycho-acoustic model for spectrum components obtained by transforming the waveform signal SW shown in FIG. 3A is a curve MCa indicated by a dotted line in FIG. 4A. In this case, the relationship between spectrum components for the waveform signal SW' actually used for coding and the masking curve is calculated using the same psycho-acoustic model. As a result, for example, a masking curve MCb shown in FIG. 4B is obtained.

More specifically, when the two types of masking curves MCa and MCb are compared with each other with respect to the spectrum components obtained by transforming the waveform signal SW shown in FIG. 4A, the masking curves MCa and MCb are partially different from each other as in a masking curve shown in FIG. 4C. In FIG. 4C, a curve indicated by a dotted line shows the masking curve MCa, and a curve indicated by a solid line shows the masking curve MCb. FIG. 4C shows the following. That is, when the levels of the signal FL immediately before the attack portion and the signal RE of the release portion are raised by the gain control, the levels of the spectrum components are uniformly amplified in a wide frequency band, and a masking curve which has a level partially different from a level at which masking is actually performed by the waveform signal SW and which is improper as an psycho-acoustic model is calculated. As a result, when the signal coded using the masking curve MCb is decoded by the decoding apparatus, another quantization noise different from a pre-echo or a post-echo is generated.

SUMMARY OF THE INVENTION

The present invention has been made in consideration of the above circumstances, and has as its object to provide a coding method and a coding apparatus which can prevent generation of a pre-echo and a post-echo and can perform effective coding by applying an psycho-acoustic model.

The coding method and coding apparatus according to the present invention solve the above problem by the following manner.

That is, an attack portion in which the levels of the waveform elements of the waveform signal sharply rise and a release portion in which the levels of the waveform elements of a waveform signal sharply lower are detected, and gain control is performed to at least a waveform element before the attack portion and an waveform element of the release portion by using a gain control amount which is adaptively selected depending on the characteristics of the waveform signal from a plurality of gain control amounts. A masking level based on an psycho-acoustic model is calculated from the waveform signal, a plurality of frequency components are coded using the masking level, and control information for the gain control is coded.

More specifically, according to the present invention, the gain control is performed to prevent a pre-echo and a post-echo from being generated. When the plurality of frequency components obtained by transforming the waveform signal, a masking level obtained on the basis of the psycho-acoustic model is used to avoid coding from being performed using an improper masking curve obtained by gain control.

BRIEF DESCRIPTION OF THE DRAWINGS

FIGS. 3A to 3C are graphs for explaining a conventional gain control processing technique for preventing generation of a pre-echo;

FIGS. 7A to 7D are graphs for explaining a technique for processing an psycho-acoustic model window circuit in the embodiment of the present invention;

FIGS. 8A to 8J are graphs for explaining a technique for processing an psycho-acoustic model application circuit in the embodiment of the present invention;

FIGS. 11A to 11J are graphs for explaining a technique for processing an psycho-acoustic model application circuit in the embodiment in FIG. 5.

DESCRIPTION OF THE PREFERRED EMBODIMENTS

Preferred embodiments of the present invention will be described below with reference to the accompanying drawings.

Figure 5:
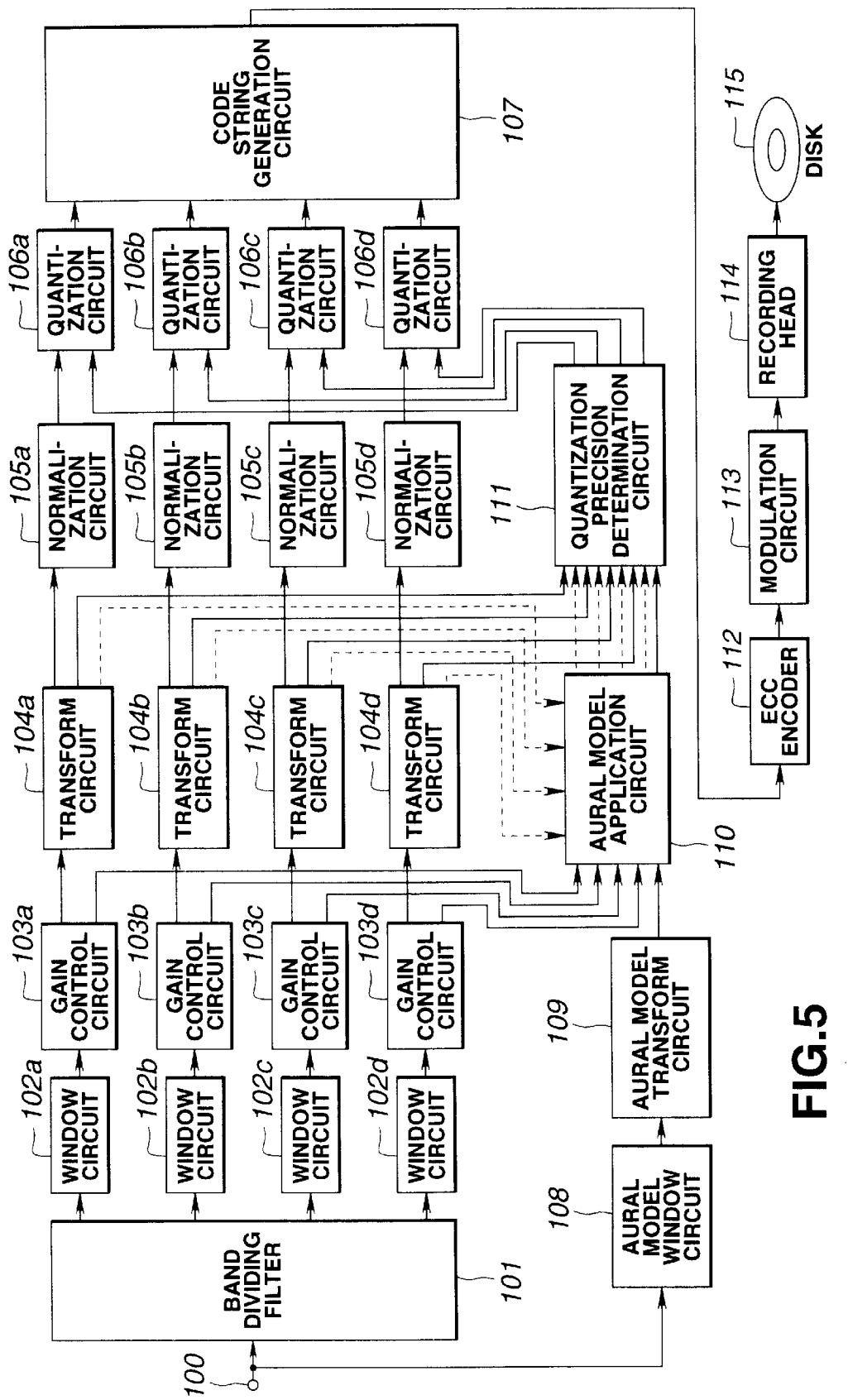
FIG. 5 is a block diagram showing the schematic arrangement of a coding apparatus according to an embodiment of the present invention.

FIG. 5 shows a coding apparatus, according to an embodiment of the present invention, to which a coding method of the present invention is applied.

More specifically, the coding apparatus of the present invention has a band division filter 101 for dividing an input signal into a plurality of band; window circuits 102a to 102d for dividing signal components into blocks in units of divided bands to multiplying the signal components by a transform window function in units of the blocks; gain control circuits 103a to 103d for calculating gain control functions in units of divided bands to perform a gain control process; transform circuits 104a to 104d for transforming the signal components subjected to gain control into frequency components; normalization circuits 105a to 105d for normalizing the frequency components in the bands; an psycho-acoustic model window circuit 108 for cutting the input signal for only an psycho-acoustic model to multiply the input signal by the transform window function; an aural model transform circuit 109 for transforming an output signal from the aural model window circuit 108 into frequency components; an aural model application circuit 110 for applying an aural psychological model to the frequency components from the aural model transform circuit 109 to output an analysis result, a quantization precision determination circuit 111 for determining quantization precision by using the analysis result of the aural psychological model on the basis of the signal transformed into the frequency components; quantization circuits 106a to 106d for quantizing the quantized frequency components at the determined quantization precision; and a code string generation circuit 107 for generating a code string signal on the basis of the quantized frequency components, normalization coefficient information obtained in normalization, and quantization precision information.

FIG. 5 shows, as an arrangement used when a code string signal generated by the coding apparatus is recorded on an optical disk 115 serving as an information recording medium, an ECC encoder 112 for performing error correction coding, a modulation circuit 113 for performing predetermined modulation to output data from the ECC encoder 112 to form a recording signal to be recorded on the optical disk 115, and a recording head 114 for recording the recording signal on the optical disk 115.

Referring to FIG. 5, a sound signal (sample data of a waveform signal) such as digital audio signal is supplied to a terminal 100. This sound signal is divided into, e.g., signal components of four bands, by the band division filter 101 to which the polyphase quadrature filter is applied. The signal components of the four bands divided by the band division filter 101 are supplied to the window circuits 102a to 102d, respectively. In the window circuits 102a to 102d, the supplied signals of the bands are cut in blocks each having a predetermined length, the signal components of adjacent blocks are overlapped, and each block is multiplied by a transform window function. At this time, when the signal is divided into four bands as shown in FIG. 5, the bandwidth is ¼ the bandwidth of the signal supplied to the terminal 100, and the signal from the terminal 100 is thinned by ¼. In FIG. 5, the input acoustic waveform signal is output from the band division filter 101 such that the acoustic waveform signal is divided into four bands. The number of divided bands may be increased or decreased as a matter of course.

The next gain control circuits 103a to 103d detect whether an attack portion or a release portion is present in the blocks multiplied by the transform window function by the window circuits 102a to 102d corresponding to the bands, and calculate a gain control function corresponding to the detected attack portion or the release portion to calculate a final gain control function. A gain control process for amplifying a small-amplitude signal component (quasi stationary signal) before the attack portion in the corresponding block or a gain control process for amplifying the signal component of the release portion in the corresponding block is performed.

If the gain control circuits 103a to 103d detect no attack portion or no release portion, a signal amplifying process is not performed to the signal components of the blocks. The signal components (i.e., waveform elements) of the blocks supplied through the gain control circuits 103a to 103d are supplied to the transform circuits 104a to 104d, and also supplied to the psycho acoustic model application circuit 110. The gain control circuits 103a to 103d output not only the signal components (waveform elements) of the blocks, but also attack/release portion detection flags representing the presence of the attack or release portion in the blocks, position information representing the attack/release portion detection flags, gain control information, and a gain control function.

The transform circuits 104a to 104d perform spectrum transform such as DFT, DCT, or MDCT to the signal components of the blocks. The spectrum components obtained by the spectrum transform are grouped in units of bands. In this case, as the bandwidth obtained by band division in the filter, or a width used when the spectrum components subjected to the spectrum transform are grouped in units of bands, i.e., a bandwidth, a uniform bandwidth or a non-uniform bandwidth which is matched with so-called critical bands obtained in consideration of the psycho-acoustic characteristics of the human being may be used.

On the other hand, a sound signal supplied to the terminal 100 is also supplied to the psycho-acoustic model window circuit 108. In the psycho-acoustic model window circuit 108, the supplied sound signal is cut into components in blocks each having a predetermined length which is equal to or different from that of each block of the window circuits 102a to 102d, and sample data between adjacent blocks are overlapped. Each block is multiplied by a transform window function. The sound signal supplied to the psycho-acoustic model window circuit 108 is not a signal whose band is divided through the band division filter 101, but a sound signal supplied to the terminal 100. This is because, when a band is divided, an psycho acoustic model may be erroneously calculated due to generation of aliasing noise. In order to avoid this, the sound signal from the terminal 100 is directly supplied to the psycho-acoustic model window circuit 108.

In the aural model transform circuit 109, the spectrum transform such as DFT or DCT is performed to the signal components of the blocks multiplied by the transform window function by the aural model window circuit 108. The transform performed by the same manner as in the transform circuits 104a to 104d is properly used as the spectrum transform because an psycho-acoustic model along coding can be applied. The spectrum components obtained by the spectrum transform are supplied to the psycho-acoustic model application circuit 110.

In the aural model application circuit 110, an psycho acoustic model is applied to the spectrum components from the psycho-acoustic model transform circuit 109 by using the gain control information and the gain control function output from the gain control circuits 103a to 103d, thereby calculating a proper making level for the spectrum components.

More specifically, in the psycho-acoustic model application circuit 110, masking levels calculated using masking characteristics and loudness characteristics on the basis of a minimum audible level or the supplied spectrum components are calculated in units of frequencies corresponding to spectrum components of the signal frequencies obtained by the psycho-acoustic model transform circuit 109 or in units of bands in which the signal frequencies are divided. In addition, when the masking levels are transformed using the gain control information and gain control function which are supplied, proper masking levels for the spectrum components are calculated. The information of the masking levels calculated in the psycho-acoustic model application circuit 110 is supplied to the quantization precision determination circuit 111.

The detailed process of the psycho-acoustic model application circuit 110 will be described later. In the above case, in the psycho-acoustic model application circuit 110, the masking levels are calculated using outputs from the gain control circuits 103a to 103d. However, as in a path indicated by a dotted line in FIG. 5, by using spectrum components obtained such that signal components subjected to gain control by the gain control circuits 103a to 103d are transformed by the transform circuits 104a to 104d, masking levels may be calculated.

In the normalization circuits 105a to 105d, the spectrum components supplied from the transform circuits 104a to 104d are normalized in predetermined bands, and the normalized spectrum components are supplied to the quantization circuits 106a to 106d, respectively.

Figure 1A:
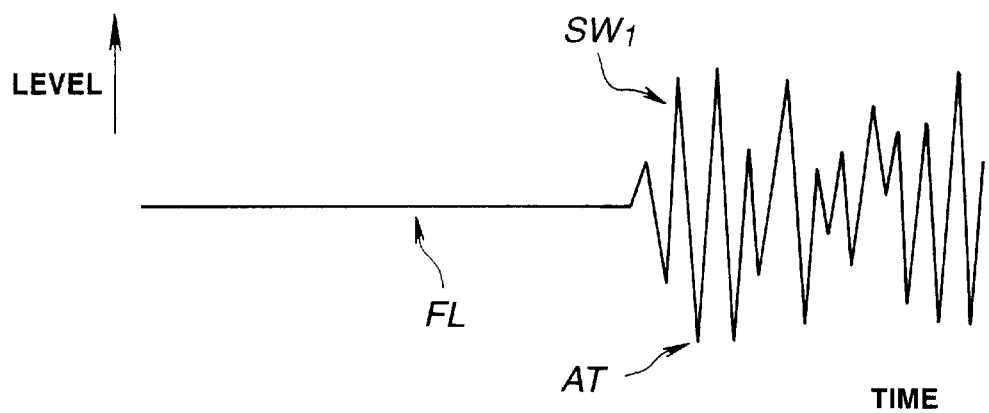
FIGS. 1A to 1C are graphs for explaining an operation principle of generation of a pre-echo by transform coding.
Figure 1B:
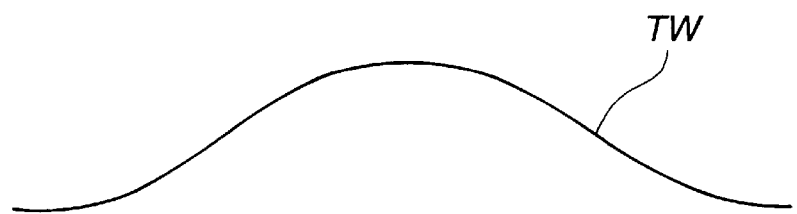
Figure 1C:
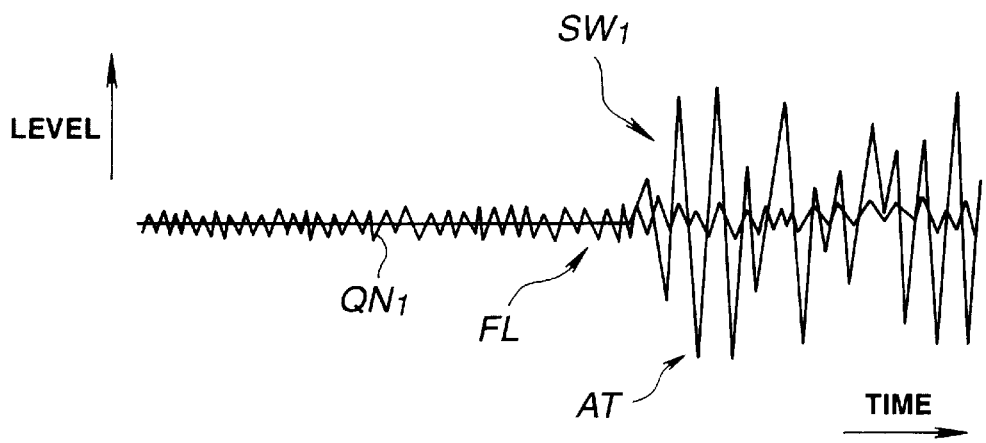
Figure 2A:
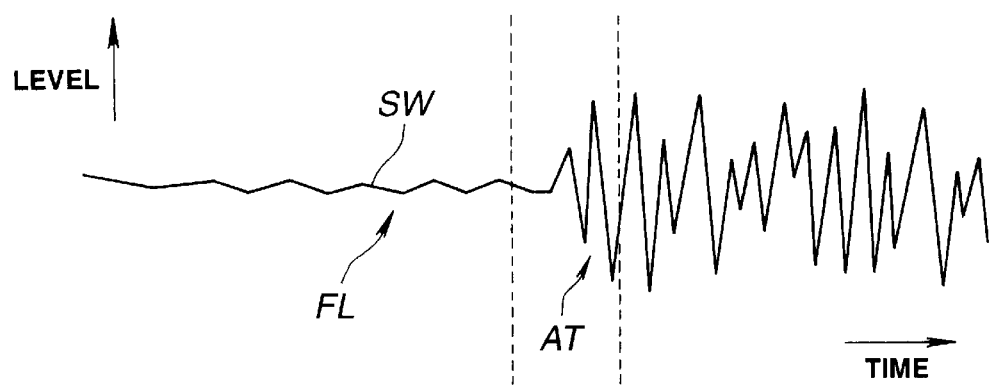
FIGS. 2A and 2B are graphs for explaining a conventional window processing technique for preventing generation of a pre-echo.
Figure 2B:
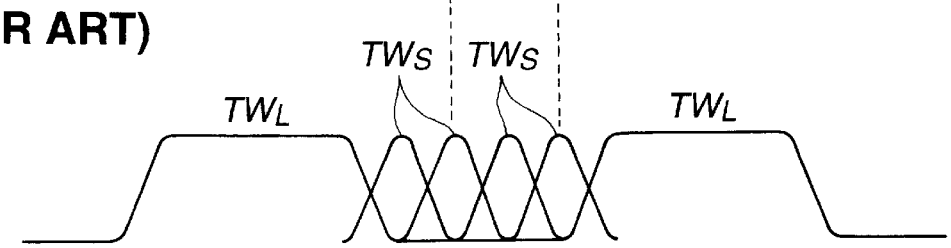
Figure 4A:
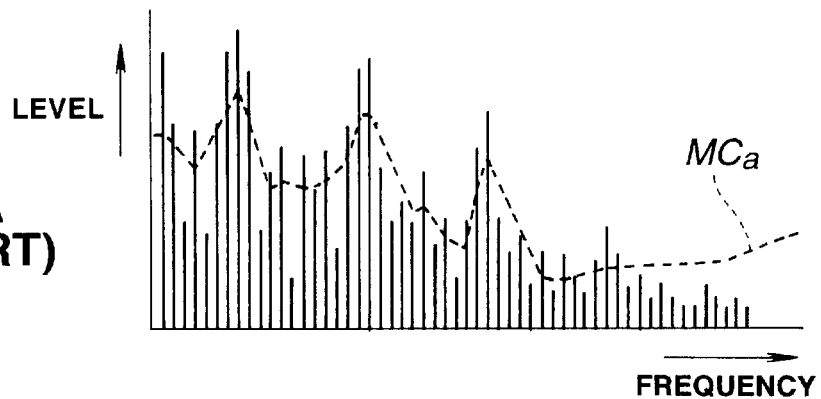
FIGS. 4A to 4C are graphs showing the states of an psycho-acoustic model in a conventional processing technique for preventing generation of a pre-echo.
Figure 4B:
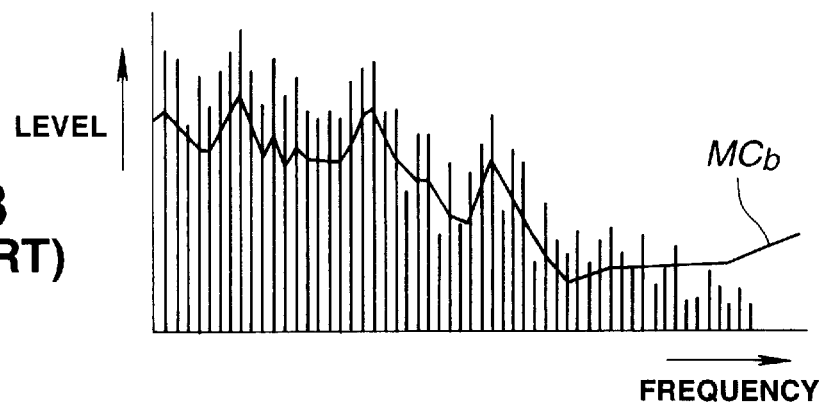
Figure 4C:
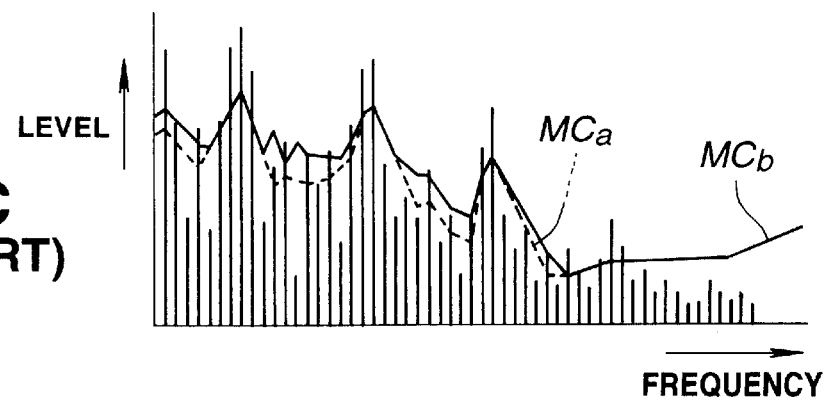

In the quantization precision determination circuit 111, quantization precision is determined by using the spectrum components supplied from the transform circuits 104a to 104d and the masking level information supplied from the psycho-acoustic model application circuit 110, and the quantization precision information is supplied to the quantization circuits 106a to 106d corresponding to the bands. As a path indicated by a dotted line in FIG. 4, when masking levels are calculated in the psycho-acoustic model application circuit 110 by using the spectrum components from the transform circuits 104a to 104d, masking level information of each band from the aural model application circuit 110 may be supplied to the quantization precision determination circuit 111.

In the quantization circuits 106a to 106d, quantization is performed to signals from the normalization circuits 105a to 105d on the basis of the quantization precision calculated by the quantization precision determination circuit 111, and the quantized signal, normalization coefficient information, and quantization precision information are supplied to the code string generation circuit (multiplexer) 107.

The multiplexer 107 generates and outputs a code string signal on the basis of the quantized signals of the bands supplied from the quantization circuits 106a to 106d, the normalization coefficient information, and the normalization precision information. More specifically, the output signal from the multiplexer 107 includes, in addition to the signals quantized by the quantization circuits 106a to 106d, the normalization coefficient information in the normalization circuits 105a to 105d, the quantization precision information in the quantization precision determination circuit 111, attack/release portion detection flags representing the presence of an attack portion or a release portion in the blocks, position information representing the positions of the attack/release portion detection flags, the gain control information, and the gain control function.

The code string signal generated by the multiplexer 107 is supplied to the ECC encoder 112. In the ECC encoder 112, an error correction coding process for adding an error correction code to the code string signal supplied from the multiplexer 107 is performed. An output from the ECC encoder 112 is subjected to modulation such as so-called Eight to Fourteen modulation by the modulation circuit 113. The modulated signal is supplied to the recording head 114 as a recording signal. The recording head 114 records the recording signal output from the modulation circuit 113 on the optical disk 115. As the optical disk 115, for example, a photomagnetic disk, a phase-change disk, or the like can be used. In place of the optical disk 115, a semiconductor memory such as a magnetic tape or an IC card can also be used. The recording signal is recorded on the recording medium such as a disk, communicated, and transmitted by a transmission path.

Figure 6:
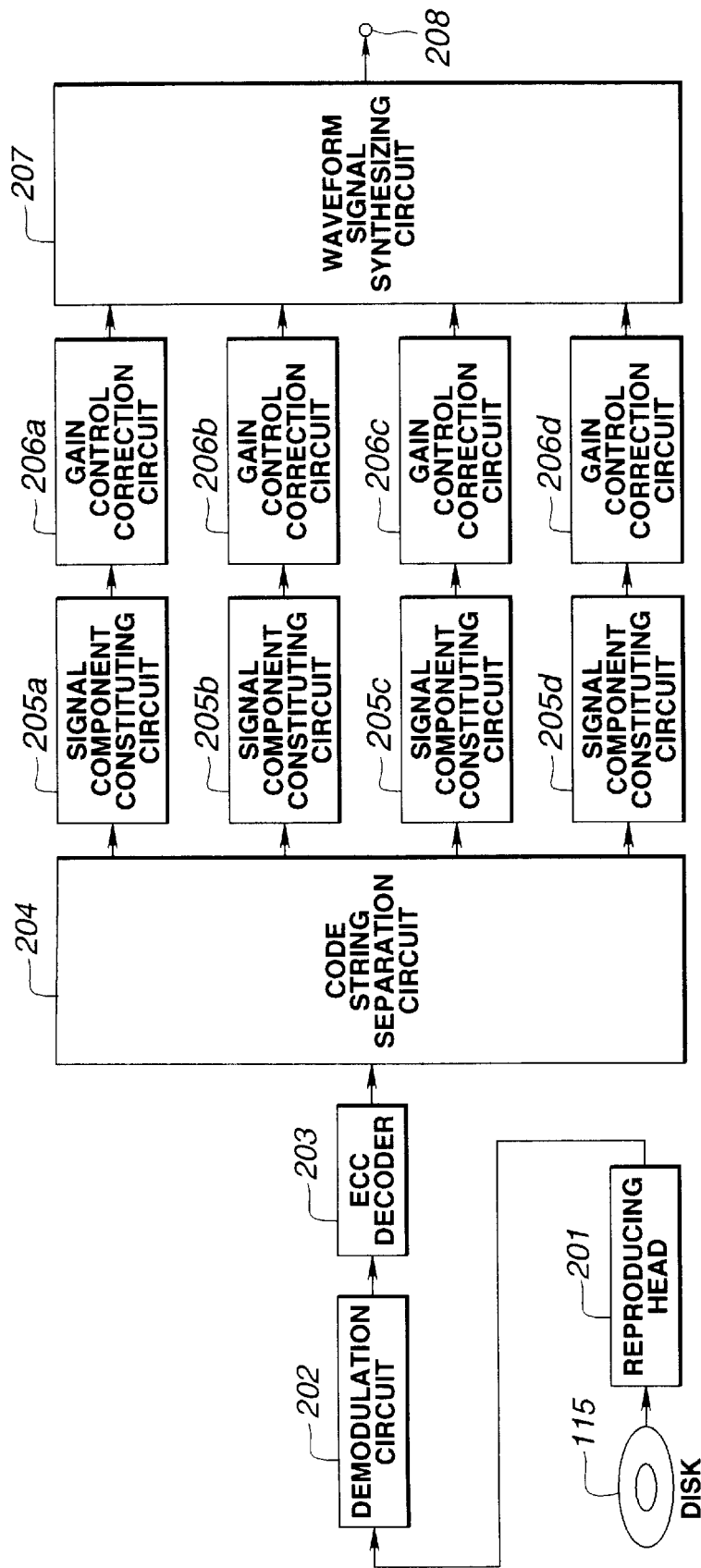
FIG. 6 is a block diagram showing the schematic arrangement of a signal decoding apparatus according to an embodiment of the present invention.

FIG. 6 shows the basic arrangement of a decoding apparatus in which the code string signal generated by the coding apparatus shown in FIG. 5 and recorded on the information recording medium or transmitted to the transmission medium is decoded to decode a digital audio signal.

The decoding circuit shown in FIG. 6 has, as main constituent elements, a code string separation circuit (de-multiplexer) 204 for extracting a quantization signal, quantization precision information, and normalization coefficient information from the code string signal, signal component constituting circuits 205a to 205d for constituting signal components of bands on the basis of the obtained quantization signal, quantization precision information, and normalization coefficient information, gain control correction circuits 206a to 206d for performing a gain control correcting process to the signal components of the bands, and a waveform signal synthesizing circuit 207 for synthesizing a waveform signal on the basis of the signal components of the bands. FIG. 6 also shows, as constituent elements for reproducing the code string signal recorded on the optical disk 115 serving as an information recording medium, a reproducing head 201, a demodulation circuit 202 for performing demodulation corresponding to modulation in the modulation circuit 113 in FIG. 5 to the reproduced signal from the reproducing head 201, and an ECC decoder 203 for performing an error correcting process to a signal obtained by demodulation.

Referring to FIG. 6, for example, the signal reproduced by the reproducing head 201 from the optical disk 115 serving as information recording medium is sent to the demodulation circuit 202. Since the signal reproduced by the reproducing head 201 from the optical disk 115 is modulated, the demodulation circuit 202 demodulates t he modulated signal. The output signal from the demodulation circuit 202 is transmitted to the decoder 203. The ECC decoder 203 performs error correction to the signal . The signal subjected to the error correction is the code string signal and the code string signal is sent to the de-multiplexer 204. The code string signal includes the quantization signal, normalization coefficient information, and quantization precision information.

The de-multiplexer 204 separates the quantization signals, pieces of normalization coefficient information, pieces of quantization precision information of bands corresponding to the four bands described in FIG. 5 from each other, and sends these signals and pieces of information to the signal component constituting circuits 205a to 205d, respect ively.

The signal component constituting circuits 205a to 205d use the pieces of quantization precision information to inversely quantize the quantized signal, and use the pieces of normalization coefficient information to cancel normalization. In addition, the signal component constituting circuits 205a to 205d perform a reconstructing process (i.e., inverse spectrum transform) corresponding to the process (i.e., spectrum transform) performed in the coding apparatus in FIG. 5, for resolving a signal into frequency components to the signal obtained by canceling the normalization, thereby recovering the signal components (sample data) of the bands. The signal components of the bands from the signal component constituting circuits 205a to 205d are sent to the corresponding gain control correction circuits 206a to 206d.

The gain control correction circuits 206a to 206d perform a gain control correction process for attenuating small-amplitude quasi stationary signal components before the attack portion and the signal components of the release portion, on the basis of attack/release portion detection flags representing the presence of the attack or release portion in the blocks separated by the code string separation circuit, position information representing the positions of the attack/release portion detection flags, and gain control amount information. The gain control correction process in the gain control correction circuits 206a to 206d is a process of multiplying a gain control correction function serving as the inverse number of the gain control function used in coding.

When the signal components amplified in coding are attenuated as described above, of quantization noise almost uniformly extended in the blocks when inverse spectrum transform from a frequency area to a time area is performed by the above signal component constituting circuits 205a to 205d, quantization noise generated before or after the attack portion is suppressed to a low level. For this reason, an aural hinderance caused by a pre-echo or a post-echo is also suppressed. On the other hand, the gain control correction circuits 206a to 206d do not perform a signal attenuating process for the signal components in the blocks in which an attack or release portion is not present and which are not subjected to the amplifying process in coding. The signal components of the blocks passing through the gain control correction circuits 206a to 206d are sent to the waveform signal synthesizing circuit 207.

The waveform signal synthesizing circuit 207 performs a process of synthesizing the bands divided by four. In this manner, a digital audio signal subjected to band synthesization is output from the waveform signal synthesizing circuit 207. The digital audio signal is output from an output terminal 208, converted into an analog signal by an D/A converter (not shown), and then amplified by an amplifier. The amplified signal is sent to a sound generating means such as a loudspeaker, a headphone, or an earphone, or output from a voice line output terminal or the like.

The process of the psycho-acoustic model application circuit 110 will be described below.

In the signal coding/decoding, a waveform signal in which a pre-echo and a post-echo is generated is subjected to gain control by the gain control circuit 103 before and after an attack portion, and is subjected to gain control correction by the gain control correction circuit 206. Not only the pre-echo before the attack portion, but also the post-echo after the release portion after the attack portion can be prevented from being generated. The attack portion AT detecting method in the block and the method of selecting a gain control function for portions before and after the detected attack portion AT have been proposed by the present applicant with the specification and drawings in Japanese Patent Application No. 7-38266.

In the present invention, in order to prevent coding using an improper masking curve obtained by gain control, the aural model window circuit 108, the aural model transform circuit 109, and the aural model application circuit 110 are independently arranged for an aural model. Masking level calculation corresponding to a change in frequency component caused by gain control is performed by these circuits.

In this case, assume that the sum of analysis lengths used when analysis is performed by the window circuits 102a to 102d, i.e., the length of an input signal cut with overlapping to be coded, is represented by L. In this case, the aural model window circuit 108 uses a window having a length of $L/2^n$ (n: natural number) as an analysis length to separately analyze the input signal in a plurality of areas.

More specifically, as shown in FIGS. 7A–7D and, the length of a window applied to the input signal in the window circuits 102a to 102d is set to be L as shown in FIG. 7A, and the analysis blocks having overlapping areas are represented by W0, W1, and W2 as shown in FIG. 7A. For example, when the portion represented by W1 is to be coded, the aural model window circuit 108 applies a window having an analysis length of $L/2^n$ as shown in FIGS. 7B–7D and to the portion W1, calculation using the subsequent psycho-acoustic psychological model is performed to analyze the respective blocks. For example, FIG. 7B shows a case wherein the psycho-acoustic model is analyzed in three steps such that a window having an analysis length of L/2 is applied. Similarly, FIG. 6C shows a case wherein the psycho-acoustic model is analyzed in seven steps such that a window having an analysis length of L/4 is applied, and FIG. 6D shows a case wherein the psycho-acoustic model is analyzed in fifteen step such that a window having an analysis length of L/8 is applied.

The psycho-acoustic model transform circuit 109 performs spectrum transform to the blocks divided by the aural model window circuit 108. Division in the psycho-acoustic model window circuit 108 is performed in unit of $½^n$ (n: natural number to make the spectrum transform in this case easy.

The psycho-acoustic model application circuit 110 uses the gain control information and gain control function from the gain control circuits 103a to 103d to apply the psycho-acoustic model to the spectrum components from the aural model transform circuit 109. More specifically, the following case is considered. That is, an input signal SW shown in FIG. 8A is used to perform gain control having a gain control amount which is Ra times to the signal component of a portion immediately before the attack portion AT such that the signal component is multiplied by a gain control function GC shown in FIG. 8B. In FIG. 8B, the amplitudes of input signals have negative and positive levels. However, in FIG. 7B shows only a positive level.

At this time, three windows each having an analysis length of L/2 as shown in FIG. 8C are to be applied, three spectrum distributions shown in FIGS. 8D, 8E, and 8F are obtained from an output from the psycho-acoustic model transform circuit 109.

An psycho-acoustic model such as a minimum audible level, masking characteristics, or loudness characteristics is applied to each spectrum distribution, and the masking level of the divided block is calculated. In this case, masking curves mcD, mcE, and mcF as indicated by dotted lines in FIGS. 8D, 8E, and 8F are obtained. Since the masking levels of the divided blocks have not been subjected to gain control, the masking levels of the divided blocks in the portions in FIGS. 8D, 8E, and 8F lower, and the masking levels of the divided blocks in FIG. 8F rise.

The masking level of each divided block is amplified by a minimum value (or an average value, preferably, a minimum value) of the gain control level of the signal portion of the corresponding block. For example, the masking level is one magnified Ra times (×Ra) in FIGS. 8D and 8E, and the masking level is one having equal magnification (×1) in FIG. 8F. More specifically, since a signal to be coded has a level amplified by a corresponding multiplying power by the gain control, the masking curve of the divided block corresponding to the signal is amplified by the same level. Masking curves MCG, MCII, and MCI of the divided blocks indicated by dotted lines in FIGS. 7G to 7I are obtained by boosting the levels of the masking curves mcD, mcE, and mcF of the divided blocks in FIGS. 8D, 8E, and 8F by values of the gain control.

Therefore, since the three masking curves MCG, MCH, and MCI indicated by the dotted lines FIGS. 8G, 8H, and 8I represent the masking levels of the divided blocks, respectively, the minimum value of the masking levels of the divided blocks is properly used as the masking level of all the coding blocks. For this reason, a masking curve MCJ obtained by selecting any minimum value of the masking curves MCG, MCH, and MCI in FIGS. 8G, 8H, and 8I as indicated by solid lines in FIG. 8J is obtained.

The masking level obtained as described above is supplied to the quantization precision determination circuit 111. In the quantization precision determination circuit 111, by using the spectrum components of the bands supplied from the transform circuits 104a to 104d and the masking level information supplied from the psycho-acoustic model application circuit 110, the quantization precision of each coding block is calculated. In the quantization circuits 106a to 106d, the signals from the normalization circuits 105a to 105d are quantized by using the quantization precision information. More specifically, in the quantization circuits 106a to 106d can perform coding to which an psycho-acoustic model is applied.

In finely dividing the analysis length, each divided analysis length of masking is preferably decreased to an analysis length of gain control. However, since the frequency resolution power of masking analysis decreases with a decrease in analysis length by fine dividing, fine dividing is optimally performed not to influence analysis for masking.

When the minimum value is not used as the level of gain control applied to the masking level of each divided block, but the masking level is multiplied by an average value, the gain control level is multiplied by a window function of this position to obtain an average, and a value obtained by normalizing the average by a value at level of 1 may be used. However, when the shape of the window is symmetrical, the calculation may be performed by using only the average value to reduce a calculation value.

A method of calculating a masking level for eliminating quantization noise generated when an audio signal serving as a waveform signal is quantized is described as described above, the method of the present invention is effective for eliminating generation of quantization noise of another type of signal. In particular, since a pre-echo or a post-echo in the attack portion of the audio signal is an aural hindrance, the present invention is effectively applied to an audio signal. The method of the present invention can also be applied to a multichannel audio signal as a matter of course.

Another coding method of the present invention will be described below with reference to FIG. 9.

In the coding apparatus having the above arrangement in FIG. 6, signal components are divided into a plurality of analysis areas which overlap, and the masking levels of the analysis areas are calculated to be coded. When the masking levels of the divided masking levels of the divided analysis areas are calculated, gain control amount in the analysis areas are used. In this case, since a position where a gain control level is switched does not always coincide with a position where analysis area is divided, when the positions do not coincide with each other, the minimum value (or average value) of the gain control amount is used. In addition, when the number of divided analysis areas is increased to shorten the length of the block, the probability of difference between the position where the gain control level is switched and the division position of the analysis area can be decreased.

In contrast to this, according to another coding method of the present invention, when a masking level is transformed by the gain control amount of the analysis area independently of a gain control position, an optimum masking level corresponding to the gain control amount is calculated without degrading the frequency resolving power of masking analysis to make it possible to realize effective coding.

Figure 9:
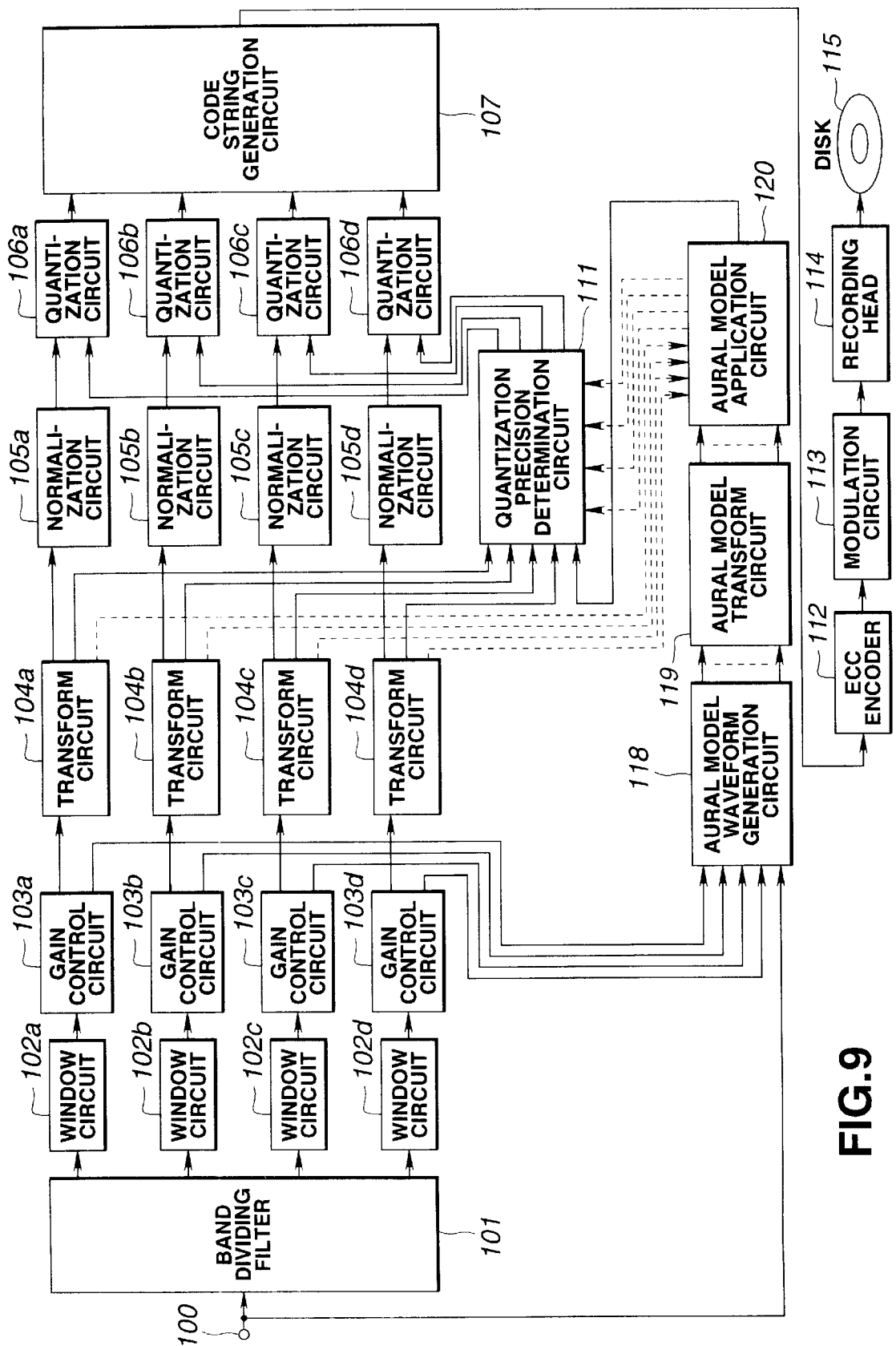
FIG. 9 is a block diagram showing the schematic arrangement of a coding apparatus according to another embodiment of the present invention.

FIG. 9 shows the schematic arrangement of a coding apparatus to which the above coding method is applied. The same reference numeral as in FIG. 5 denote the same parts in FIG. 8, and a description thereof will be omitted except for a portion which is required for explanation.

More specifically, the coding apparatus of the present invention comprises, in place of the psycho-acoustic model window circuit 108 to the aural model application circuit 110 in the arrangement in FIG. 5, an aural model waveform generation circuit 118 for generating an analyzing waveform signal on the basis of an input signal, an aural model transform circuit 119 for transforming the aural model analyzing signal into a frequency component, and an aural model application circuit 120 for applying an psycho-acoustic model to the aural model analyzing frequency component to output an analysis result.

The coding apparatus of the embodiment in FIG. 9 will be described below.

A sound signal supplied to the input terminal 100 is sent to the arrangement subsequent to the band division filter 101, and is also sent to the psycho-acoustic model waveform generation circuit 118. The gain control function calculated by the gain control circuits 103a to 103d is also sent to the psycho-acoustic model waveform generation circuit 118. The psycho-acoustic model waveform generation circuit 118 cuts the sound signal supplied through the input terminal 100 in units of blocks each having a predetermined length, and overlaps the signals of adjacent blocks, and multiplies a transform window function to each block. A plurality of waveform signals for analyzing an psycho-acoustic model are generated on the basis of the gain control function sent from the gain control circuits 103a to 103d. The plurality of waveform signals are independently sent to the psycho-acoustic model transform circuit 119.

At this time, the sound signal supplied from the terminal 100 does not pass through the band division filter 101, and has no band which is divided. When the gain control function sent from the gain control circuits 103a to 103d is not subjected to a signal amplifying process, the psycho-acoustic model waveform generation circuit 118 multiplies the transform window function to the sound signal after the sound signal is cut in units of blocks, and directly sends the sound signal to the psycho-acoustic model transform circuit 119 together with gain control levels of the waveform signals. The detailed process of the psycho-acoustic model waveform generation circuit 118 will be described later.

In the psycho-acoustic model transform circuit 119, by using a method which is the same as or different from the method in transform circuits 104a to 104d, spectrum transform is performed to one psycho-acoustic model analyzing waveform signal or a plurality of psycho-acoustic model analyzing waveform signals. Spectrum components obtained by the spectrum transform are sent to the psycho-acoustic model application circuit 120. The gain control levels are directly sent.

In the psycho-acoustic model application circuit 120, an psycho-acoustic model is applied to one spectrum component or a plurality of spectrum components sent from the transform circuit 119 to calculate a proper masking level for each spectrum component. More specifically, in the psycho-acoustic model application circuit 120, masking levels calculated from a minimum audible level or the supplied spectrum components by using masking characteristics or loudness characteristics are calculated in units of frequencies corresponding to the spectrum components of the signal frequencies obtained by the psycho-acoustic model transform circuit 119 or in units of bands obtained by dividing the signal frequencies. When a plurality of signals of spectrum components are sent from the psycho-acoustic model transform circuit 119, the signals of the spectrum components are transformed by the gain control levels sent from the psycho-acoustic model transform circuit 119 in units of frequency bands to obtain a plurality of masking levels, and the minimum value of the plurality of masking levels is selected. The information of the selected masking level is sent to the quantization precision determination circuit 111. The detailed process of the psycho-acoustic model application circuit 120 will be described later.

The quantization precision determination circuit 111 determines a quantization precision by using the spectrum components of the bands supplied from the transform circuits 104a to 104d and the masking level information supplied from the psycho-acoustic model application circuit 120, and sends the quantization precision information to the quantization circuits 106a to 106d corresponding to the bands, respectively.

In the arrangement in FIG. 9, as in the arrangement shown in FIG. 5, outputs from the transform circuits 104a to 104d can be supplied to the psycho-acoustic model application circuit 120 along a path indicated by the dotted line in FIG. 9. Since the basic arrangement of the decoding apparatus in which the code string signal generated by the coding apparatus shown in FIG. 8 and recorded on the information recording medium or transmitted to the transmission medium is decoded to decode a digital audio signal is the same as the arrangement shown in FIG. 6, a description thereof will be omitted.

The process of the psycho-acoustic model waveform generation circuit 118 will be described below.

In the arrangement of the present invention shown in FIG. 9, a waveform signal is divided by applying a window for forming waveform signals in gain control levels for analyzing an psycho acoustic model, and masking levels are calculated in units of waveform signals. The gain control levels corresponding to the plurality of waveform signals are used to calculate the masking levels of the coding blocks, and only a change in gain control level is referred to in the psycho-acoustic model waveform generation circuit 118.

Figure 10A:
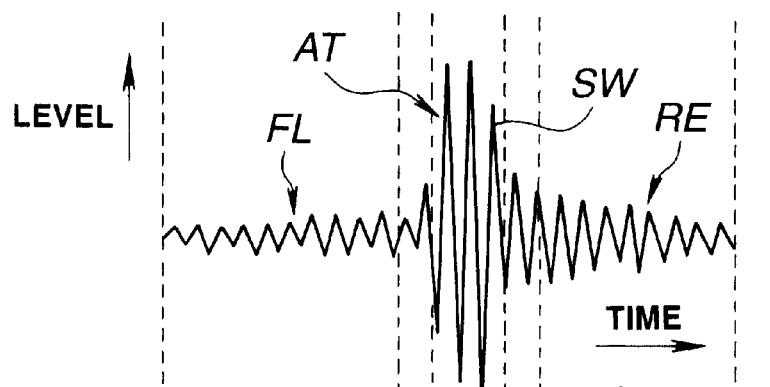
FIGS. 10A to 10H are graphs for explaining a technique for processing a waveform generation circuit for psycho-acoustic model analysis in the embodiment in FIG. 5.
Figure 10B:
Figure 10C:
Figure 10D:
Figure 10E:

In this case, assume that an input signal SW cut for analysis from the waveform signal input to the input terminal 100 is as shown in FIG. 10A, and that a gain control function GC corresponding to the waveform signal SW and determined by the gain control circuits 103a to 103d, as shown in FIG. 9B, has a coefficient which is one magnified Ra times (×Ra) in an FL portion of a quasi stationary signal, is one having equal magnification (×1) in an AT portion serving as an attack portion, and is Rr times in an RE portion serving as a release portion. At this time, the psycho-acoustic model waveform generation circuit 118 cuts the corresponding block from the input signal, overlaps the signal components of adjacent blocks, and multiplies a transform window function to each block, thereby cutting the signal components of the waveform signal SW in FIG. 10A. The signal components are multiplied by divided window functions as shown in FIGS. 10C, 10D, and 10E.

Figure 10F:
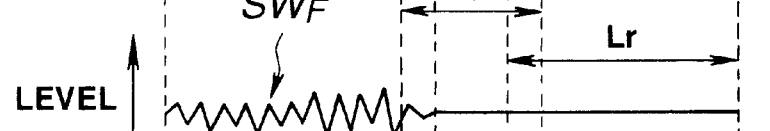

More specifically, divided window functions in which the position of a change portion of the gain control function coincides with the position of a change portion of a window level are multiplied to each other. According to the divided window functions, in the window for dividing the FL portion shown in FIG. 10C, the FL portion is not changed, a portion other than the FL portion, i.e., the AT portion or RE portion, is suppressed to 0 level. Similarly, in a window for dividing the AT portion shown in FIG. 10D or the RE portion shown in FIG. 10E, a portion other than the AT or RE portion is suppressed to 0 level. A point at which a window level changes is set such that the change start position of the gain control function coincides with the change start position of the window level and the change end position of the gain control function coincides with the change end position of the window level. As a result, the divided waveform signals are shown as three waveform signals SWF, SWG, and SWH respectively shown in FIGS. 10F, 10G, and 10H. In this case, when the divided waveform signals are the three waveform signals SWF, SWG, and SWH shown in FIGS. 10F, 10G, and 10H, the level of a portion other than the corresponding portion is suppressed by a dividing window in each waveform component. For this reason, when the signals are transformed into spectrum components with a large block length, the level lowers in the entire large block length.

Therefore, as shown in FIGS. 9A to 9H, the length of the entire block is represented by Ls, the length of the FL portion is represented Lf, the length of the RE portion is represented by Lr. In this case, level correction is performed such that the signal level is Ls/Lf times in the FL portion, the signal level is Ls/La in the AT portion, and the signal level is Ls/Lr times in the RE portion. When waveform signals having different sounds are present in a block, e.g., when the sound of the first half portion of the block is entire different from the sound of the second half portion of the block, level correction is not preferably performed in the block. For this reason, the level correction is not performed when waveform signals having different sounds are present in a block. The plurality of waveform components calculated as described above are sent to the psycho-acoustic model transform circuit 119 together with the gain control levels of the waveform signals.

When an aural model analyzing signal is divided in units of gain control levels by applying a dividing window to correct the levels, the masking levels of the signals of the gain control amounts can be calculated regardless of the switching position of the gain control level of an input signal.

When a waveform signal is divided by four by means of the band dividing filter as shown in FIG. 9 to be coded, changes in gain control levels in the four bands are different from each other. In this case, at all the positions at which the gain control levels of the bands change, the waveform signal is divided.

The process of the psycho-acoustic model application circuit 120 will be described below.

In the psycho-acoustic model transform circuit 119 performs spectrum transform to one waveform signal or a plurality of waveform signals obtained by the psycho-acoustic model waveform generation circuit 118. The resultant signals are sent to the aural model application circuit 120. Gain control levels corresponding to the waveform signals are directly sent to the psycho-acoustic model application circuit 120.

The psycho-acoustic model application circuit 120 applies an psycho-acoustic model to one spectrum component or a plurality of spectrum components sent from the aural model transform circuit 119. More specifically, for example, if spectrum components shown in FIGS. 11D, 11G, and 11F are obtained with respect to three divided waveform signals SWA, SWB, and SWC (these waveform signals are the same as the waveform signals SWF, SWG, and SWH shown in FIGS. 10F, 10G, and 10H) at each gain control level as shown in FIGS. 10A, 10B and 10C, an aural psychological model is applied to these spectrum components to calculate masking levels. Assume that, on the basis of the calculated masking curve, masking curves mcd, mce, and mcf indicated by dotted lines in FIGS. 11D, 11G, and 11F are obtained.

Figure 10G:
Figure 10H:
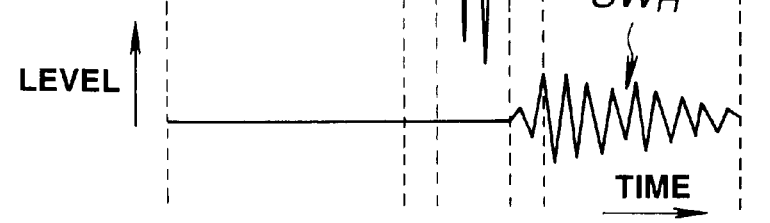

The gain control levels sent from the psycho-acoustic model transform circuit 119 are multiplied to the masking curves. More specifically, since the portion is multiplied by the inverted number of the gain control levels in coding, the signals corresponding to the gain control levels can amplifies the masking levels by a value corresponding to the inverted number. For this reason, the masking level is amplified at a multiplying power of Ra in the FL portion shown in FIG. 11A, the masking level is amplified at a multiplying power of 1 in the AT portion shown in FIG. 11B, and the masking level is amplified at a multiplying power of Rr in the RE portion shown in FIG. 11C. Therefore, masking curves MCg, MCh, and MCi indicated by dotted lines in FIGS. 11G, 11H, and 11I are obtained from the masking levels corresponding to the waveform signals SWA, SWB, and SWC. Since the minimum value of the masking levels having the divided waveforms is properly used as the masking level of the entire block, a masking curve MCj indicated by a solid line in FIG. 10J and having the minimum value of the masking curves MCg, MCh, and MCi in FIGS. 10G, 10H, and 10I is obtained for a spectrum which is gain-controlled as shown in FIG. 10J to be amplified.

The masking level calculated as described above is sent to the quantization precision determination circuit 111, a quantization precision of the coding block corresponding to the masking level is calculated, and quantization is performed in the quantization circuits 106a to 106d. More specifically, the quantization circuits 106a to 106d can perform coding to which an psycho-acoustic model is applied.

As described above, in the arrangement in FIG. 9, a masking level is calculated on the basis of a spectrum component of each gain control level, and transform is performed at the gain control level, so that a masking level can be properly transformed regardless of a switching position of the gain control level of the input signal.

When an input signal is divided by the band dividing filter in four bands as shown in FIG. 9 to be coded, the gain control levels in the four bands may be different from each other. In this case, when the masking levels shown in FIGS. 11D, 11E, and 11F are amplified into the masking levels shown in FIGS. 11G, 11H, and 11I, the masking levels are amplified in units of corresponding frequency bands in accordance with the gain control levels.

In the arrangement shown in FIG. 9, a method of calculating a masking level for reducing quantization noise generated when an audio signal is quantized as a waveform signal has been described above. However, the method of the present invention is also effective to reduce quantization noise of another type of signal. For example, the present invention can also be applied to an image signal. However, a pre-echo or a post-echo in the attack portion of an audio signal is a serious aural hinderance, the present invention is very effectively applied to the audio signal. The method of the present invention can also be applied to a multi channel audio signal.

According to the present invention, an attack portion and a release portion are detected, and gain control is performed to at least the waveform elements before the attack portion and the waveform elements of the release portion by using a gain control amount which is adaptively selected from a plurality of gain control amounts according to the characteristics of the waveform signal. For this reason, a pre-echo and a post-echo can be prevented from being generated.

According to the present invention, when a plurality of frequency components obtained by transforming a waveform signal are to be coded, the plurality of frequency components are coded by using masking levels calculated from the waveform signal on the basis of an psycho-acoustic model to avoid coding using an improper masking curve by gain control. For this reason, effective coding to which the aural psychological model is applied can be performed.

What is claimed is:

1. A method of coding a sound signal, comprising the steps of:

detecting an attack portion of a waveform signal;

detecting a release portion of the waveform signal;

adaptively selecting a gain control amount from a plurality of gain control amounts for at least the waveform elements before the attack portion and the waveform elements of the release portion according to the characteristics of the waveform signal;

performing gain control to at least the waveform elements before the attack portion and the waveform elements of the release portion by using the selected gain control amount;

transforming the waveform signal into a plurality of frequency components;

separately analyzing the waveform signal to calculate a masking level based on a psycho-acoustic model from the waveform signal using the selected gain control amount;

determining a quantization precision of the frequency components by using the masking level; and coding the plurality of frequency components by using the quantization precision, and coding control information for the gain control.

2. A coding method according to claim 1, wherein the masking level is calculated on the basis of a frequency component obtained by performing spectrum transform to the waveform signal.

3. A coding method according to claim 2, wherein the frequency component is a component of an entire frequency band obtained by performing spectrum transform to the waveform signal.

4. A coding method according to claim 1, wherein the waveform signal is divided into a plurality of analysis areas which overlap, and the masking level is selected from the masking levels of the analysis areas.

5. A coding method according to claim 4, wherein the masking level of the analysis area is calculated using the selected gain control amount.

6. A coding method according to claim 1, wherein the masking level is calculated on the basis of an psycho-acoustic model in which the frequency components are calculated in units of frequencies having corresponding gain control amounts.

7. A coding method according to claim 6, wherein the waveform signal is divided into a plurality of waveform signals for the selected gain control amounts, and the masking level is selected from the masking levels of the divided waveform signals.

8. A coding method according to claim 7, wherein the masking levels of the divided waveform signals are calculated using the selected gain control amount.

9. An apparatus for coding a sound signal, comprising:
attack portion detecting means for detecting an attack portion of a waveform signal;
release portion detecting means for detecting a release portion of the waveform signal;
selecting means for adaptively selecting a gain control amount from a plurality of gain control amounts for at least the waveform elements before the attack portion and the waveform elements of the release portion according to the characteristics of the waveform signal;
gain control means for performing gain control to at least the waveform elements before the attack portion and the waveform elements of the release portion by using the selected gain control amount;
transforming means for transforming the waveform signal into a plurality of frequency components;
masking level calculating means for separately analyzing the waveform signal to calculate a masking level based on a psycho-acoustic model from the waveform signal using the selected gain control amount;
determining means for determining a quantization precision of the frequency components by using the masking level; and
coding means for coding the plurality of frequency components by using the quantization precision, and coding control information for the gain control.

10. A coding apparatus according to claim 9, wherein the masking level is calculated on the basis of a frequency component obtained by performing spectrum transform to the waveform signal.

11. A coding apparatus according to claim 10, wherein the frequency component is a component of an entire frequency band obtained by performing spectrum transform to the wave form signal.

12. A coding apparatus according to claim 9, wherein the waveform signal is divided into a plurality of analysis areas which overlap, and the masking level is selected from the masking levels of the analysis areas.

13. A coding apparatus according to claim 12, wherein the masking level of the analysis area is calculated using the selected gain control amount.

14. A coding apparatus according to claim 9, wherein the masking level is calculated on the basis of an psycho-acoustic model in which the frequency components are calculated in units of frequencies having corresponding gain control amounts.

15. A coding apparatus according to claim 14, wherein the waveform signal is divided into a plurality of waveform signals for the selected gain control amounts, and the masking level is selected from the masking levels of the divided waveform signals.

16. A coding apparatus according to claim 15, wherein the masking levels of the divided waveform signals are calculated using the selected gain control amount.

17. A method of coding a sound signal, comprising the steps of:

detecting an attack portion of a waveform signal;
detecting a release portion of the waveform signal;
adaptively selecting a gain control amount from a plurality of gain control amounts for the waveform elements before the attack portion and the waveform elements of the release portion according to the characteristics of the waveform signal;
performing gain control to the waveform elements before the attack portion and the waveform elements of the release portion by using the selected gain control amount;
transforming the waveform signal into a plurality of frequency components;
separately analyzing the waveform signal to calculate a masking level based on a psycho-acoustic model from the waveform signal using the selected gain control amount; and
coding the plurality of frequency components by using the masking level, and coding control information for the gain control.

18. A coding method according to claim 17, wherein the masking level is calculated on the basis of a frequency component obtained by performing spectrum transform to the waveform signal.

19. A coding method according to claim 18, wherein the frequency component is a component of an entire frequency band obtained by performing spectrum transform to the waveform signal.

20. A coding method according to claim 17, wherein the waveform signal is divided into a plurality of analysis areas which overlap, and the masking level is selected from the masking levels of the analysis areas.

21. A coding method according to claim 20, wherein the masking level of the analysis area is calculated using the selected gain control amount.

22. A coding method according to claim 17, wherein the masking level is calculated on the basis of an psycho-acoustic model in which the frequency components are calculated in units of frequencies having corresponding gain control amounts.

23. A coding method according to claim 22, wherein the waveform signal is divided into a plurality of waveform signals for the selected gain control amounts, and the masking level is selected from the masking levels of the divided waveform signals.

24. A coding method according to claim 23, wherein the masking levels of the divided waveform signals are calculated using the selected gain control amount.

25. An apparatus for coding a sound signal, comprising:
attack portion detecting means for detecting an attack portion of a waveform signal;
release portion detecting means for detecting a release portion of the waveform signal;
selecting means for adaptively selecting a gain control amount from a plurality of gain control amounts for the waveform elements before the attack portion and the waveform elements of the release portion according to the characteristics of the waveform signal;
gain control means for performing gain control to the waveform elements before the attack portion and the waveform elements of the release portion by using the selected gain control amount;
transforming means for transforming the waveform signal into a plurality of frequency components;
masking level calculating means for separately analyzing the waveform signal to calculate a masking level based on a psycho-acoustic model from the waveform signal using the selected gain control amount; and coding means for coding the plurality of frequency components by using the masking level, and coding control information for the gain control.

26. A coding apparatus according to claim 25, wherein the masking level is calculated on the basis of a frequency component obtained by performing spectrum transform to the waveform signal.

27. A coding apparatus according to claim 26, wherein the frequency component is a component of an entire frequency band obtained by performing spectrum transform to the wave form signal.

28. A coding apparatus according to claim 25, wherein the waveform signal is divided into a plurality of analysis areas which overlap, and the masking level is selected from the masking levels of the analysis areas.

29. A coding apparatus according to claim 28, wherein the masking level of the analysis area is calculated using the selected gain control amount.

30. A coding apparatus according to claim 25, wherein the masking level is calculated on the basis of an psycho-acoustic model in which the frequency components are calculated in units of frequencies having corresponding gain control amounts.

31. A coding apparatus according to claim 30, wherein the waveform signal is divided into a plurality of waveform signals for the selected gain control amounts, and the masking level is selected from the masking levels of the divided waveform signals.

32. A coding apparatus according to claim 31, wherein the masking levels of the divided waveform signals are calculated using the selected gain control amount.

33. An information recording medium for use in sound signal coding, the information recording medium comprising:

a recording surface having a recording signal recorded thereon, wherein the recording signal is generated by detecting an attack portion of a waveform signal,
detecting a release portion of the waveform signal,
adaptively selecting a gain control amount from a plurality of gain control amounts for at least the waveform elements before the attack portion and the waveform elements of the release portion according to the characteristics of the waveform signal,
performing gain control to at least the waveform elements before the attack portion and the waveform elements of the release portion by using the selected gain control amount,
transforming the waveform signal into a plurality of frequency components,
separately analyzing the waveform signal to calculate a masking level based on a psycho-acoustic model from the waveform signal using the selected gain control amount,
determining a quantization precision of the frequency components by using the masking level, and
coding the plurality of frequency components by using the quantization precision, and coding control information for the gain control.

34. An information recording medium for use in sound signal coding, the information recording medium comprising:

a recording surface having a recording signal recorded thereon, wherein the recording signal is generated by detecting an attack portion of a waveform signal,
detecting a release portion of the waveform signal,
adaptively selecting a gain control amount from a plurality of gain control amounts for the waveform elements before the attack portion and the waveform elements of the release portion according to the characteristics of the waveform signal,
performing gain control to the waveform elements before the attack portion and the waveform elements of the release portion by using the selected gain control amount, transforming the waveform signal into a plurality of frequency components,
separately analyzing the waveform signal to calculate a masking level based on a psycho-acoustic model from the waveform signal using the selected gain control amount; and
coding the plurality of frequency components by using the masking level, and coding control information for the gain control.

35. A method of coding a sound signal, comprising the steps of:

detecting an attack portion of a waveform signal;
adaptively selecting a gain control amount from a plurality of gain control amounts for at least the waveform elements before the attack portion according to the characteristics of the waveform signal;
performing gain control to at least the waveform elements before the attack portion by using the selected gain control amount;
transforming the waveform signal into a plurality of frequency components;
separately analyzing the waveform signal to calculate a masking level based on a psycho-acoustic model from the waveform signal using the selected gain control amount; and
coding the plurality of frequency components by using the masking level, and coding control information for the gain control.

36. An apparatus for coding a sound signal, comprising:

attack portion detecting means for detecting an attack portion of a waveform signal;
selecting means for adaptively selecting a gain control amount from a plurality of gain control amounts for the waveform elements before the attack portion according to the characteristics of the waveform signal;
gain control means for performing gain control to at least the waveform elements before the attack portion by using the selected gain control amount;
transforming means for transforming the waveform signal into a plurality of frequency components;
separately analyzing the waveform signal to calculate a masking level based on a psycho-acoustic model from the waveform signal using the selected gain control amount;
determining means for determining a quantization precision of the frequency components by using the masking level; and
coding means for coding the plurality of frequency components by using the quantization precision, and coding control information for the gain control.

37. An information recording medium for use in sound signal coding, the information recording medium comprising:

a recording surface having a recording signal recorded thereon, wherein the recording signal is generated by detecting an attack portion of a waveform signal,
adaptively selecting a gain control amount from a plurality of gain control amounts for at least the waveform elements before the attack portion according to the characteristics of the waveform signal, performing gain control to at least the waveform elements before the attack portion by using the selected gain control amount, transforming the waveform signal into a plurality of frequency components, separately an analyzing the waveform signal to calculate a masking level based on a psycho-acoustic model from the waveform signal using the selected gain control amount, and coding the plurality of frequency components by using the masking level, and coding control information for the gain control.

38. An apparatus for coding a sound signal, comprising:

an attack portion detection circuit that detects an attack portion of a waveform signal;

a selecting circuit that adaptively selects a gain control amount from a plurality of gain control amounts for at least the waveform elements before the attack portion a c cording to the characteristics of the waveform signal;

a gain control circuit that performs gain control to at least the waveform elements before the attack portion by using the selected gain control amount;

a transform circuit that transforms the waveform signal into a plurality of frequency components;

psycho-acoustic model application circuit that separately analyzes the waveform to calculate a masking level based on a psycho-acoustic model from the waveform signal using the selected gain amount; and a coder that codes the plurality of frequency components by using the masking level, and coding control information for the gain control.

39. An apparatus for coding a sound signal, comprising:

an attack portion detection circuit that detects an attack portion of a waveform signal;

a release portion detection circuit that detects a release portion of the waveform signal;

a selecting circuit that adaptively selects a gain control amount from a plurality of gain control amounts for at least the waveform elements before the attack portion and the waveform elements of the release portion according to the characteristics of the waveform signal;

a gain control circuit that performs gain control to at least the waveform elements before the attack portion and the waveform elements of the release portion by using the selected gain control amount;

a transform circuit that transforms the waveform signal into a plurality of frequency components;

a psycho-acoustic model application circuit that separately analyzes the waveform to calculate a masking level based on a psycho-acoustic model from the waveform signal using the selected gain amount; and a coder that codes the plurality of frequency components by using the masking level, and coding control information for the gain control.

* * * * *